US012633025B2

(12) United States Patent
Baszucki et al.

(10) Patent No.: US 12,633,025 B2
(45) Date of Patent: May 19, 2026

(54) CAMERA MAPPING IN A VIRTUAL EXPERIENCE

(71) Applicant: Roblox Corporation, San Mateo, CA (US)

(72) Inventors: David B. Baszucki, Portola Valley, CA (US); Hendri Tan, San Mateo, CA (US); Philippe Clavel, Belmont, CA (US); Garima Sinha, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 48 days.

(21) Appl. No.: 18/421,528

(22) Filed: Jan. 24, 2024

(65) Prior Publication Data

US 2025/0086871 A1     Mar. 13, 2025

Related U.S. Application Data

(60) Provisional application No. 63/548,354, filed on Nov. 13, 2023, provisional application No. 63/537,039, filed on Sep. 7, 2023.

(51) Int. Cl.
*G06T 13/40*          (2011.01)
*G06T 7/73*           (2017.01)

(52) U.S. Cl.
CPC ............... *G06T 13/40* (2013.01); *G06T 7/74* (2017.01); *G06T 2207/10016* (2013.01); *G06T 2207/30201* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 9,618,747 B2 * | 4/2017 | Villmer | .................. | G06T 11/60 |
| 10,055,880 B2 * | 8/2018 | Yan | .......................... | G06T 11/00 |
| 12,260,508 B2 * | 3/2025 | Shen | ...................... | G06T 19/006 |
| 2008/0019661 A1 * | 1/2008 | Obrador | ................. | H04N 5/147 |
| | | | | 386/210 |

(Continued)

OTHER PUBLICATIONS

Weng et al. "Real-time facial animation on mobile devices" Dec. 31, 2014, Graphical Models 76 (2014) 172-179 (Year: 2014).*

(Continued)

*Primary Examiner* — Robert J Craddock
(74) *Attorney, Agent, or Firm* — IP Spring

(57)          ABSTRACT

A metaverse application receives a first frame of a video. The metaverse application determines facial landmarks of the user in the first frame. The metaverse application generates an animation frame that includes an avatar and a background based on the facial landmarks and the first frame. The metaverse application determines a head orientation of the user in the first frame based on the facial landmarks. The metaverse application maps an orientation of the mobile device to the head orientation of the user. For each additional frame of the video subsequent to the first frame, the metaverse application updates the orientation of the mobile device. The metaverse application generates subsequent animation frames that include the avatar and the background based on the updated orientation of the mobile device in relation to the head orientation.

20 Claims, 17 Drawing Sheets

(56) References Cited

U.S. PATENT DOCUMENTS

| | | | | |
|---|---|---|---|---|
| 2008/0080747 | A1 | 4/2008 | Takagi | |
| 2013/0050260 | A1* | 2/2013 | Reitan | G06T 19/006 |
| | | | | 345/633 |
| 2014/0035929 | A1* | 2/2014 | Matthews | G06T 17/20 |
| | | | | 345/473 |
| 2018/0095636 | A1* | 4/2018 | Valdivia | G06F 3/011 |
| 2018/0181813 | A1* | 6/2018 | Sun | G06V 40/172 |
| 2019/0171869 | A1* | 6/2019 | Fortune | G06T 7/00 |
| 2019/0188867 | A1* | 6/2019 | Jiang | G06V 40/174 |
| 2019/0251336 | A1* | 8/2019 | Wu | G06F 18/22 |
| 2019/0266775 | A1* | 8/2019 | Lee | G06F 3/0346 |
| 2021/0312685 | A1* | 10/2021 | Guo | G06T 17/20 |
| 2022/0007127 | A1* | 1/2022 | Thomas | H04S 7/303 |
| 2022/0392133 | A1* | 12/2022 | Volkov | G06V 40/161 |
| 2023/0379443 | A1* | 11/2023 | Ma | G06T 7/13 |
| 2024/0242430 | A1* | 7/2024 | Li | G06V 40/174 |

OTHER PUBLICATIONS

EPO, International Search Report for International Patent Application No. PCT/US2024/045370, Nov. 21, 2024, 5 pages.

EPO, Written Opinion for International Patent Application No. PCT/US2024/045370, Nov. 21, 2024, 8 pages.

Matuzevičius, et al., "Three-Dimensional Human Head Reconstruction Using Smartphone-Based Close-Range Video Photogrammetry", Applied Sciences, vol. 12, No. 1, Dec. 27, 2021, 26 pages.

Weng, et al., "Real-time facial animation on mobile devices", Graphical Models, vol. 76, No. 3, Oct. 19, 2013, pp. 172-179.

* cited by examiner

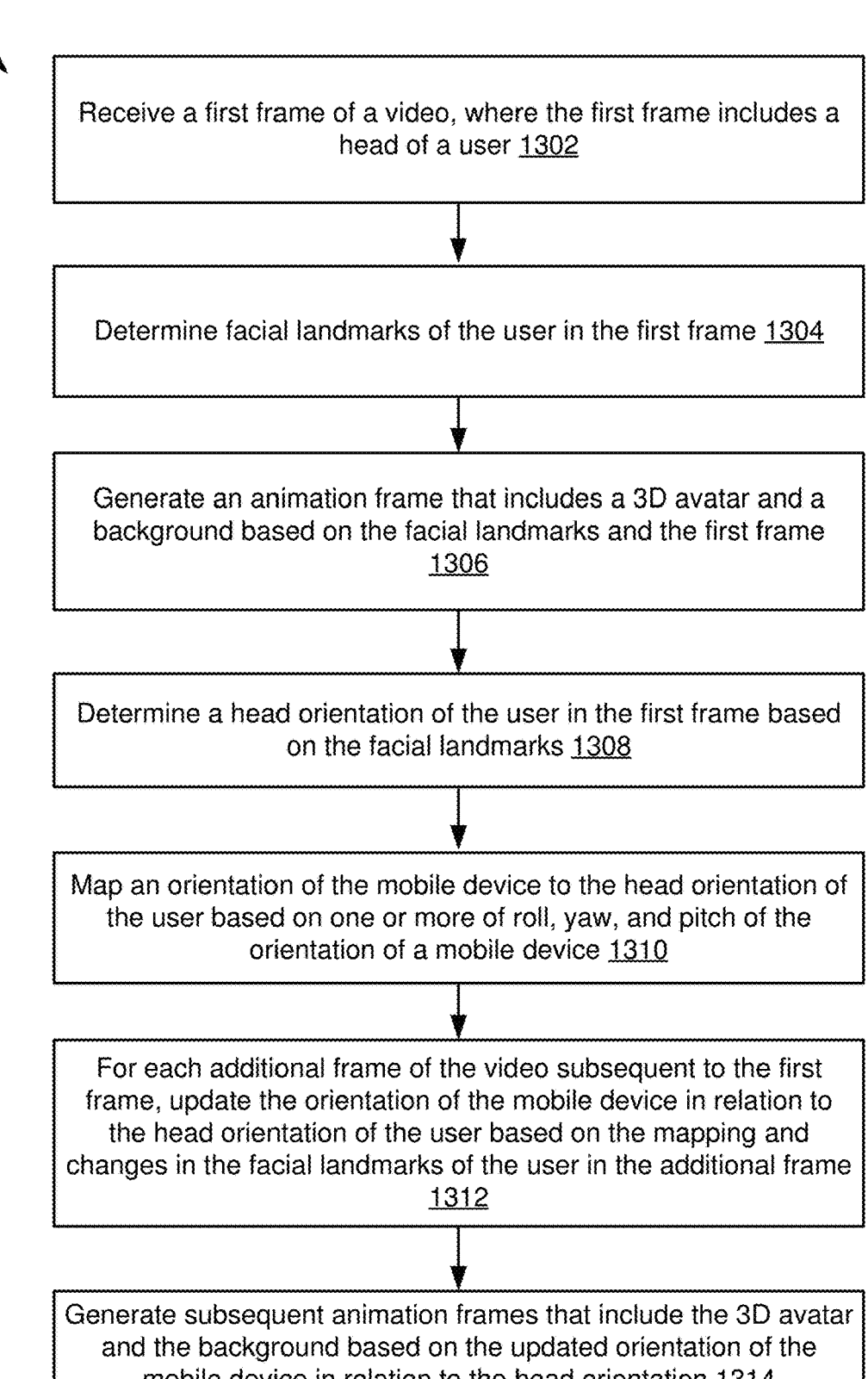

Receive a first frame of a video, where the first frame includes a head of a user 1302

Determine facial landmarks of the user in the first frame 1304

Generate an animation frame that includes a 3D avatar and a background based on the facial landmarks and the first frame 1306

Determine a head orientation of the user in the first frame based on the facial landmarks 1308

Map an orientation of the mobile device to the head orientation of the user based on one or more of roll, yaw, and pitch of the orientation of a mobile device 1310

For each additional frame of the video subsequent to the first frame, update the orientation of the mobile device in relation to the head orientation of the user based on the mapping and changes in the facial landmarks of the user in the additional frame 1312

Generate subsequent animation frames that include the 3D avatar and the background based on the updated orientation of the mobile device in relation to the head orientation 1314

FIG 13

1400

Receive, with a mobile device, a first frame of a video, where the first frame includes a head of a user 1402

Determine facial landmarks of the user in the first frame 1404

Generate bounding boxes for each of the first frame and one or more additional frames of the video that surround at least a portion of the head in the first frame, where the bounding boxes are generated based on the facial landmarks 1406

Determine, for each of the bounding boxes: x- and y-coordinates in relation to a width and a height of a respective frame and a respective distance between the mobile device and the user based on the x- and y-coordinates for the bounding box in relation to the width and the height of the respective frame 1408

Generate subsequent animation frames that include the 3D avatar and the background with the 3D avatar displayed as moving closer or farther away depending on a change in the respective distance between the mobile device and the user 1410

FIG 14

CAMERA MAPPING IN A VIRTUAL EXPERIENCE

CROSS-REFERENCE TO RELATED APPLICATIONS

The present application claims priority to U.S. Provisional Patent Application No. 63/537,039, filed on Sep. 7, 2023 and titled "Camera Mapping for a Call Conducted During a Virtual Experience," and U.S. Provisional Patent Application No. 63/548,354, filed on Nov. 13, 2023 and titled "Camera Mapping in a Virtual Experience," the contents of both of which are incorporated by reference herein in their entirety.

TECHNICAL FIELD

This disclosure relates generally to communications and computer graphics, and more particularly but not exclusively, relates to methods, systems, and computer readable media to enable mapping between an orientation of a mobile device and a head orientation of a user.

BACKGROUND

A virtual environment is a simulated three-dimensional environment generated from graphical data. Users may be represented within the virtual environment in graphical form by an avatar. The avatar may interact with other users through corresponding avatars, move around in the virtual experience, or engage in other activities or perform other actions within the virtual experience.

A user may interact with the virtual experience through their mobile device. For example, a metaverse application may receive image frames that include the user and generate a corresponding avatar. When the user moves, the metaverse application may update the avatar to move accordingly.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a system and method to map an orientation of a mobile device and a head orientation of a user. A computer-implemented method includes receiving, at a mobile device, a first frame of a video, wherein the first frame includes a head of a user. The method further includes determining facial landmarks of the user in the first frame. The method further includes generating an animation frame that includes a three-dimensional (3D) avatar and a background based on the facial landmarks and the first frame. The method further includes determining a head orientation of the user in the first frame based on the facial landmarks. The method further includes mapping an orientation of a mobile device to the head orientation of the user based on one or more of roll, yaw, and pitch of the orientation of the mobile device. The method further includes for each additional frame of the video subsequent to the first frame, updating the orientation of the mobile device in relation to the head orientation of the user based on the mapping and changes in the facial landmarks of the user in the additional frame. The method further includes generating subsequent animation frames that include the 3D avatar and the background based on the updated orientation of the mobile device in relation to the head orientation.

In some embodiments, the method further includes updating a perspective of the background in each subsequent animation frame based on the orientation of the mobile device in relation to the head orientation in a corresponding additional frame of the video. In some embodiments, the changes in the facial landmarks of the user in the additional frame indicate that the head of the user moved in a direction selected from a set of directions of up, down, left, right, and combinations thereof. In some embodiments, a predetermined percentage of the changes in the facial landmarks of the user are applied to change a direction of a face of the 3D avatar. In some embodiments, the method further includes generating bounding boxes for each of the first frame and one or more of the additional frames that surround at least a portion of the head in the first frame, wherein the facial landmarks of the user are determined based on the bounding boxes. In some embodiments, the bounding boxes enclose eyes and a bottom of a mouth in the head of the user.

In some embodiments, the method further includes determining, for each of the bounding boxes: x- and y-coordinates in relation to a width and a height of a respective frame and a respective distance between the mobile device and the user based on the x- and y-coordinates for the bounding box in relation to the width and the height of the respective frame, where generating the subsequent animation frames of the 3D avatar includes displaying the 3D avatar as moving closer or farther away depending on a change in the respective distance between the mobile device and the user. In some embodiments, the video is used during a virtual video call in a virtual experience.

In some embodiments, a system includes a processor and a memory coupled to the processor, with instructions stored thereon that, when executed by the processor, cause the processor to perform operations comprising: receiving a first frame of a video, wherein the first frame includes a head of a user; determining facial landmarks of the user in the first frame; generating an animation frame that includes a 3D avatar and a background based on the facial landmarks and the first frame; determining a head orientation of the user in the first frame based on the facial landmarks; mapping an orientation of a mobile device to the head orientation of the user based on one or more of roll, yaw, and pitch of the orientation of the mobile device; for each additional frame of the video subsequent to the first frame, updating the orientation of the mobile device in relation to the head orientation of the user based on the mapping and changes in the facial landmarks of the user in the additional frame; and generating subsequent animation frames that include the 3D avatar and the background based on the updated orientation of the mobile device in relation to the head orientation.

In some embodiments, the operations further include updating a perspective of the background in each subsequent animation frame based on the orientation of the mobile device in relation to the head orientation in a corresponding additional frame of the video. In some embodiments, the changes in the facial landmarks of the user in the additional frame indicate that the head of the user moved in a direction selected from a set of directions of up, down, left, right, and combinations thereof. In some embodiments, a predetermined percentage of the changes in the facial landmarks of the user are applied to change a direction of a face of the 3D avatar. In some embodiments, the operations further include generating bounding boxes for each of the first frame and one or more of the additional frames that surround at least a portion of the head in the first frame, wherein the facial landmarks of the user are determined based on the bounding boxes. In some embodiments, the bounding boxes encloses eyes and a bottom of a mouth in the head of the user.

In some embodiments, non-transitory computer-readable medium with instructions that, when executed by one or more processors, cause the one or more processors to perform operations, the operations comprising: receiving a first frame of a video, wherein the first frame includes a head of a user; determining facial landmarks of the user in the first frame; generating an animation frame that includes a 3D avatar and a background based on the facial landmarks and the first frame; determining a head orientation of the user in the first frame based on the facial landmarks; mapping an orientation of a mobile device to the head orientation of the user based on one or more of roll, yaw, and pitch of the orientation of the mobile device; for each additional frame of the video subsequent to the first frame, updating the orientation of the mobile device in relation to the head orientation of the user based on the mapping and changes in the facial landmarks of the user in the additional frame; and generating subsequent animation frames that include the 3D avatar and the background based on the updated orientation of the mobile device in relation to the head orientation.

In some embodiments, the operations further include updating a perspective of the background in each subsequent animation frame based on the orientation of the mobile device in relation to the head orientation in a corresponding additional frame of the video. In some embodiments, the changes in the facial landmarks of the user in the additional frame indicate that the head of the user moved in a direction selected from a set of directions of up, down, left, right, and combinations thereof. In some embodiments, a predetermined percentage of the changes in the facial landmarks of the user are applied to change a direction of a face of the 3D avatar. In some embodiments, the operations further include generating bounding boxes for each of the first frame and one or more of the additional frames that surround at least a portion of the head in the first frame, wherein the facial landmarks of the user are determined based on the bounding boxes. In some embodiments, the bounding boxes encloses eyes and a bottom of a mouth in the head of the user.

BRIEF DESCRIPTION OF THE DRAWINGS

Figure 1A:
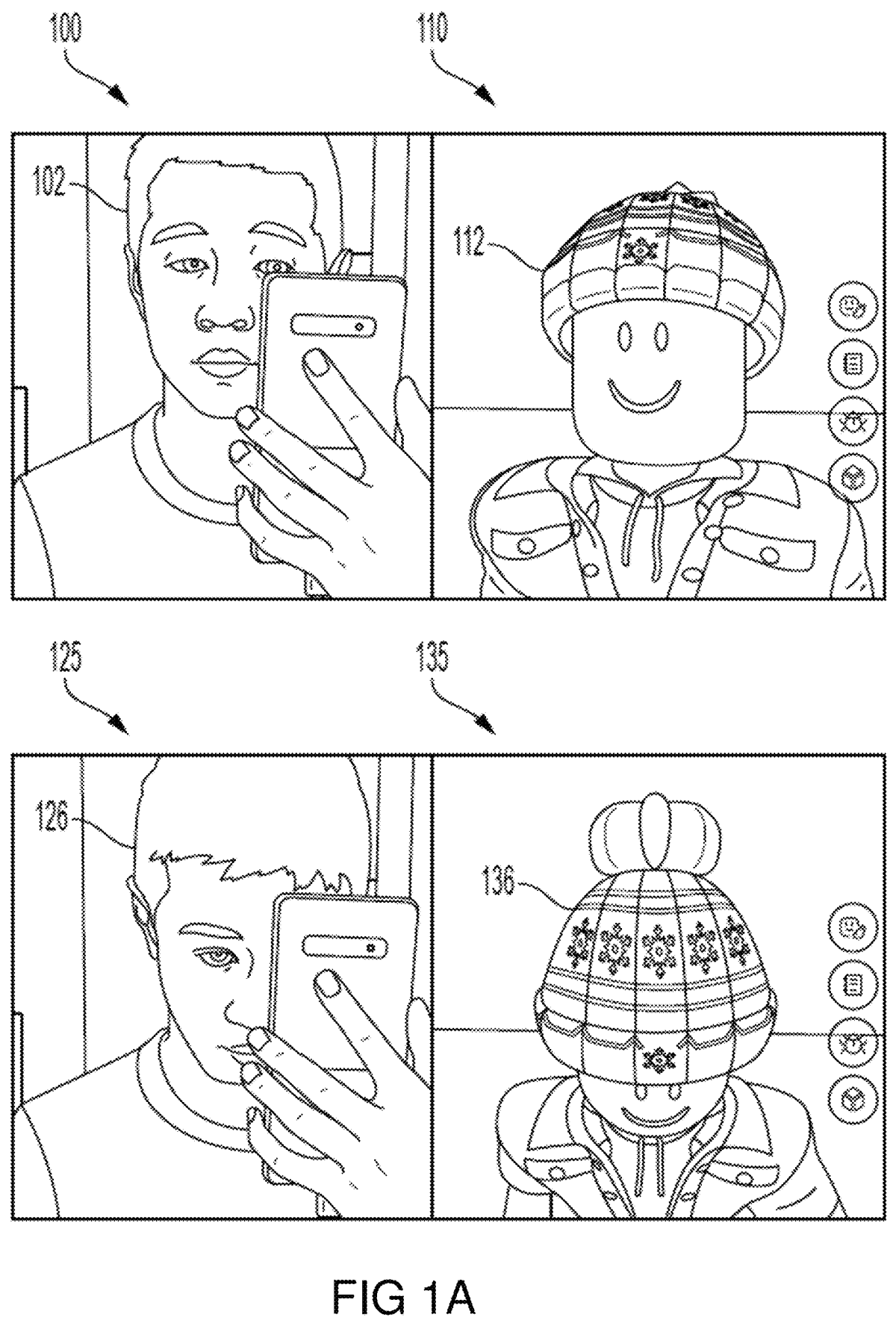

FIGS. 1A-1B includes example pairs of image frames and corresponding animation frames that illustrate camera mapping, according to some embodiments described herein.

FIG. 13 is a flow diagram of an example method to map an orientation of a mobile device to an orientation of a head of a user, according to some embodiments described herein.

FIG. 14 is a flow diagram of an example method to determine a change in depth between a mobile device and a user, according to some embodiments described herein.

DETAILED DESCRIPTION

Figure 1B:
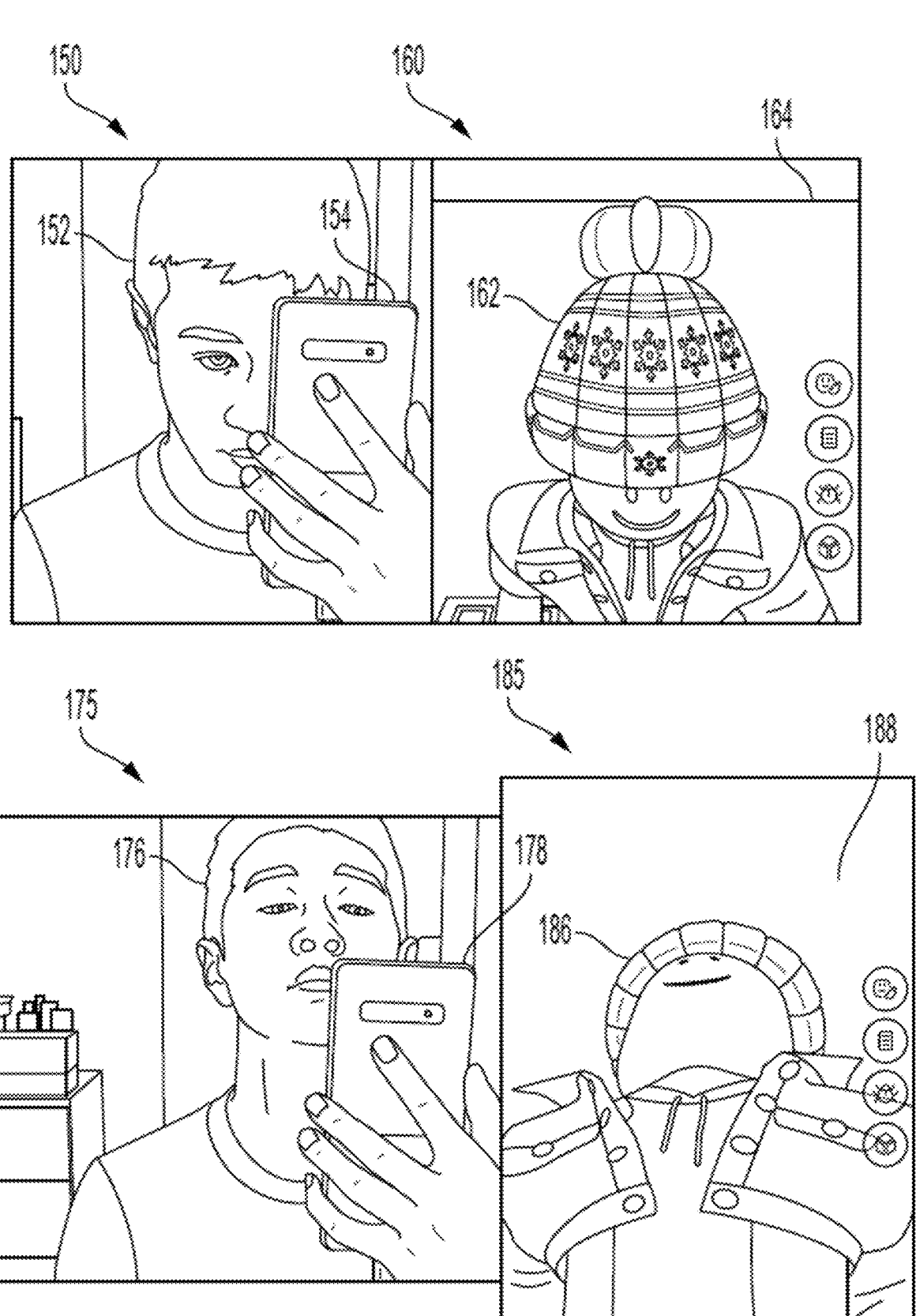

Virtual experiences enable a plurality of players, each with an associated avatar, to participate in activities such as collaborative gameplay (playing as a team), competitive gameplay (one or more users playing against other users, or teams of users competing), virtual meetups (e.g., interactive calling within a virtual experience, birthday parties, meetings within a virtual experience setting, concerts, or other kinds of events where two or more avatars are together at a same location within a virtual experience), etc. When participating together in a virtual experience, players are provided with views of the setting within the virtual experience, e.g., a campfire, a meeting room, etc. Players can view their own avatar and/or the avatars belonging to other players within the virtual experience, each avatar being at a respective position within the virtual experience.

A metaverse application may receive image frames of a video of a user and generate animation frames that include a three-dimensional (3D) avatar in a virtual experience. A problem arises when a user moves within the video. Conventional systems may generate animation frames with a 3D avatar that moves; however, the movements may not accurately reflect the movement of the user and the background may remain static. As a result, a user viewing the virtual experience may experience eye strain and nausea.

FIG. 1A includes an image frame 100 that includes a user 102 and an example animation frame 110 of an avatar 112 that was generated from the image frame 100. In this example both the user 102 in the image frame 100 and the avatar 112 in the animation frame 110 are facing forward.

FIG. 1A also includes an image frame 125 of a user 126 that is looking down and an example animation frame 135 of an avatar 136 that is generated by a conventional system. A conventional system may detect changes in the movement of the user's face and generate an animation frame of an avatar but may be unable to determine movement of the mobile device. For example, a conventional system may try to use the gyroscope and accelerometer in the mobile device to calculate movement of the mobile device, but the gyroscope data and the accelerometer data are not sufficiently precise to be used in the calculations. As a result, the conventional system may only produce changes to the avatar's face and not to the background.

Turning to the example animation frame 135 in FIG. 1A, the avatar 136 is looking down as well, but the background looks the same as the background in the animation frame 110 of a front-view of the avatar 112. The conventional system does not create an animated frame with a background that changes perspective, which results in a virtual experience that feels static.

The technology described herein advantageously remedies the problems of conventional systems by using a metaverse application that uses facial landmarks of the user to determine a head orientation of the user. The metaverse application maps an orientation of the mobile device to the head orientation of the user using the roll, yaw, and pitch of the head orientation. As a result, when the user's head moves or the mobile device moves, the metaverse application also modifies the perspective of the background to simulate a more realistic virtual experience that mimics the actions of a user. For example, the animation frames may be generated as part of a video call in the virtual experience.

FIG. 1B includes an example image frame 150 of a user 152 that looks downward while the user 152 moves the mobile device 154 upwards. The metaverse application generates an animation frame 160 that includes an avatar 162 that is also looking down and a perspective change for the background 164 as compared to the animation frame 110 in FIG. 1A.

FIG. 1B also includes an example image frame 175 of a user 176 that looks upward while the user 176 moves the mobile device 178 downward. The metaverse application generates an animation frame 185 that includes an avatar 186 that is also looking up and a perspective change for the background 188 as compared to the animation frame 110 in FIG. 1A.

Figure 2:
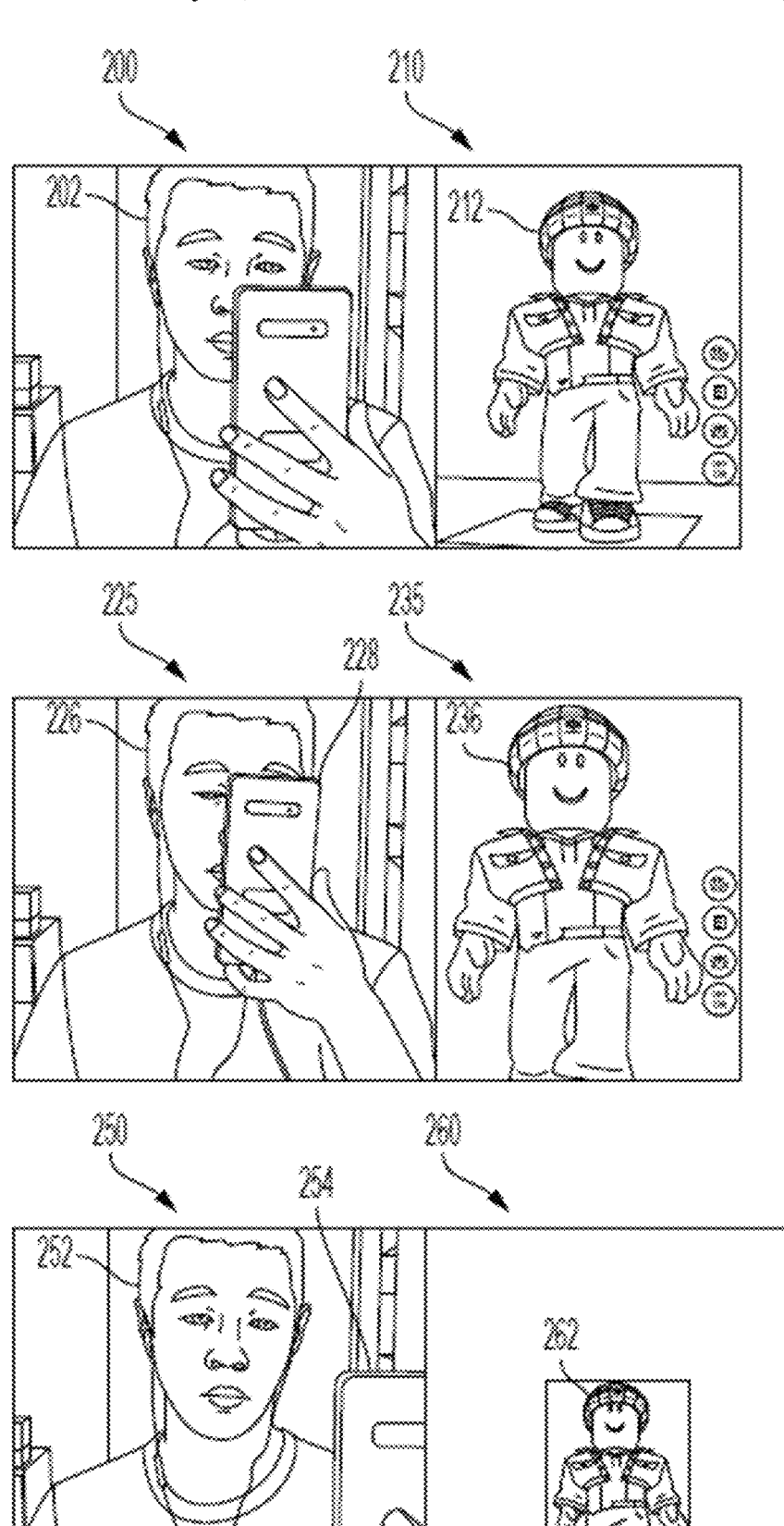
FIG. 2 includes example pairs of image frames and corresponding animation frames that illustrate depth determination, according to some embodiments described herein.

In some embodiments, the metaverse application determines a distance between the mobile device and a user and uses changes in the respective distance to generate animation frames to animate an avatar moving closer or farther away. FIG. 2 includes an example image frame 200 of a user 202 in a front view and a corresponding animation frame 210 with an avatar.

The metaverse application may generate a bounding box that surrounds at least a portion of the face and compare x- and y-coordinates for the bounding box to a width and height of the frame. As additional frames are received, the metaverse application may determine a respective distance between the user and a mobile device based on how the x- and y-coordinates for the bounding box change as compared to the height and width of the frame. For example, the bounding box grows bigger as compared to the height and width of the additional frames as the user brings the mobile device closer to the user's face. The metaverse application may display the 3D avatar as moving closer or farther away depending on a change in the distance between the mobile device and the user.

FIG. 2 includes an example image frame 225 of a user 226 with a mobile device 228 that is closer to the user's 226 face as compared with the first image frame 200. The animation frame 235 includes a closeup of an avatar 236 to reflect the decreased distance between the user 226 and the mobile device 228.

FIG. 2 includes an example image frame 250 of a user 252 with a mobile device 254 that is farther away from the user's 226 face as compared with the first image frame 200. The animation frame 260 includes a longcut of the avatar 262 to reflect the increased distance between the user 252 and the mobile device 254.

As a result of mapping the user's facial landmarks to generate an avatar that reflects head movement, perspective changes, and distance changes, the metaverse application improves the user experience and reduces or avoids causing the user eye strain and nausea.

In addition to the advantages discussed above, some conventional systems address these issues by performing post processing of the animation frames on a server. This approach requires more bandwidth for transmitting the animation frames, computational resources for performing post processing on the server, and then additional bandwidth as well as a time delay to transmit the processed frames back to the mobile device. The techniques described herein may advantageously avoid the need for additional bandwidth, computational resources, and transmission time by generating the animation frames on the mobile device.

Example Environment 300

Figure 3:
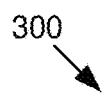
FIG. 3 is a block diagram of an example network environment, according to some embodiments described herein.
Figure 3:
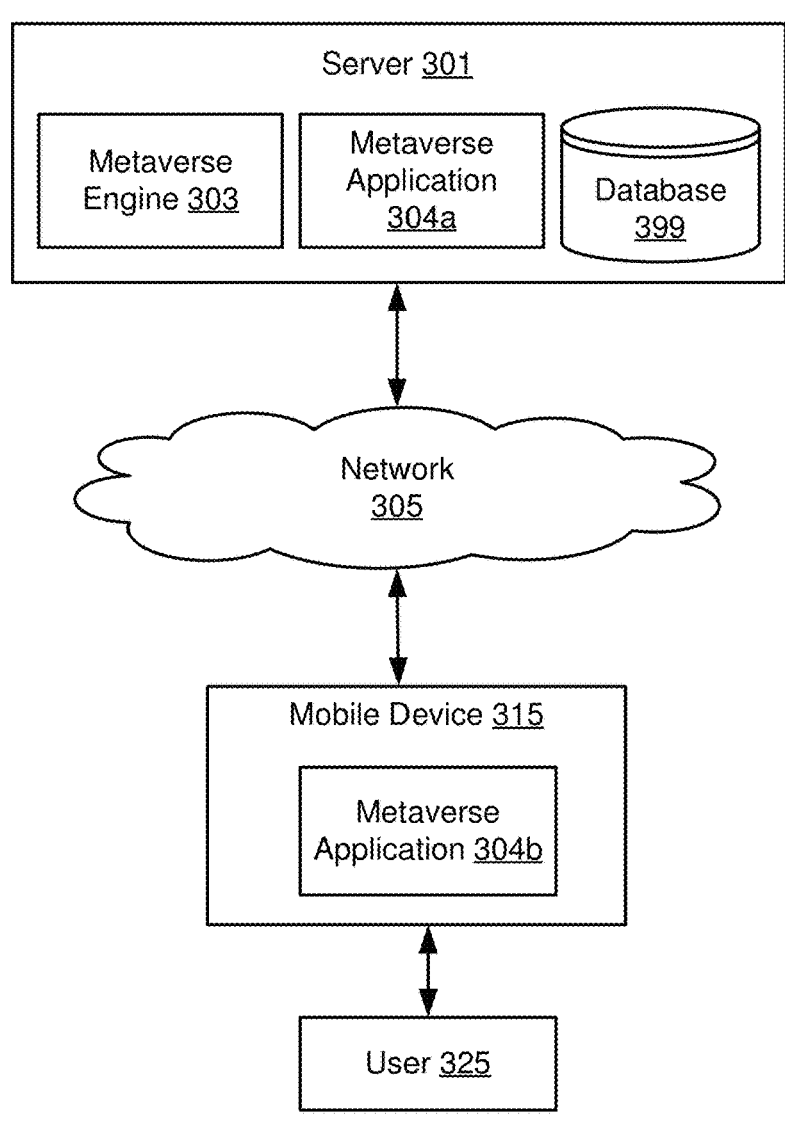

FIG. 3 illustrates a block diagram of an example environment 300. In some embodiments, the environment 300 includes a server 301 and mobile device 315, coupled via a network 305. User 325 may be associated with the mobile device 315. In some embodiments, the environment 300 may include other servers or devices not shown in FIG. 3. For example, the server 301 may include multiple servers 301 and the mobile device 315 may include multiple mobile devices 315a, n. In FIG. 3 and the remaining figures, a letter after a reference number, e.g., "315a," represents a reference to the element having that particular reference number. A reference number in the text without a following letter, e.g., "315," represents a general reference to embodiments of the element bearing that reference number.

The server 301 includes one or more servers that each include a processor, a memory, and network communication hardware. In some embodiments, the server 301 is a hardware server. The server 301 is communicatively coupled to the network 305. In some embodiments, the server 301 sends and receives data to and from the mobile device 315. The server 301 may include a metaverse engine 303, a metaverse application 304a, and a database 399.

In some embodiments, the metaverse engine 303 includes code and routines operable to generate and provide a metaverse, such as a three-dimensional (3D) virtual environment. The virtual environment may include one or more virtual experiences in which one or more users can participate as an avatar. An avatar may wear any type of outfit, perform various actions, and participate in gameplay or other types of interaction with other avatars. Further, a user associated with an avatar may communicate with other users in the virtual experience via text chat, voice chat, video (or simulated video) chat, etc. In some embodiments where a user interacts with a virtual experience in a first-person game, the display for the user does not include the user's avatar. However, the user's avatar is visible to other users in the virtual environment.

Virtual experiences may be generated by the metaverse application 304a. Virtual experiences in the metaverse/virtual environment may be user-generated, e.g., by creator users that design and implement virtual spaces within which avatars can move and interact. Virtual experiences may have any type of objects, including analogs of real-world objects (e.g., trees, cars, roads) as well as virtual-only objects.

The metaverse application 304a may generate a virtual experience that is particular to a user 325. In some embodiments, the metaverse application 304a on the server 301 receives user input from the metaverse application 304b stored on the mobile device 315, updates the virtual experience based on the user interface, and transmits the updates to other mobile devices 315b, n.

In some embodiments, the metaverse engine 303 and/or the metaverse application 304a are implemented using hardware including a central processing unit (CPU), a field-programmable gate array (FPGA), an application-specific integrated circuit (ASIC), any other type of processor, or a combination thereof. In some embodiments, the metaverse engine 303 and/or the metaverse application 304a are implemented using a combination of hardware and software.

The database 399 may be a non-transitory computer readable memory (e.g., random access memory), a cache, a drive (e.g., a hard drive), a flash drive, a database system, or another type of component or device capable of storing data. The database 399 may also include multiple storage components (e.g., multiple drives or multiple databases) that may also span multiple computing devices (e.g., multiple server computers). The database 399 may store data associated with the virtual experience hosted by the metaverse engine 303.

The mobile device 315 may be a mobile computing device that includes a memory and a hardware processor. For example, the mobile device 315 may include a mobile device, a tablet computer, a mobile telephone, a wearable device, a head-mounted display, a mobile email device, a portable game player, an augmented reality (AR) device, a portable music player, a game console, or another electronic device capable of accessing a network 305.

The mobile device 315 includes metaverse application 304b. In some embodiments, the metaverse application 304b receives a first frame of a video, where the first frame includes a head of a user. The metaverse application 304b determines facial landmarks of the user in the first frame. The metaverse application 304b generates an animation frame that includes a 3D avatar and a background based on the facial landmarks and the first frame. The metaverse application 304b maps an orientation of the mobile device to the head orientation of the user based on one or more of roll, yaw, and pitch of the orientation of the mobile device. For each additional frame of the video subsequent to the first frame, the metaverse application 304b updates the orientation of the mobile device in relation to the head orientation of the user based on the mapping and changes in the facial landmarks of the user in the additional frame. The metaverse application 304b generates subsequent animation frames that include the 3D avatar and the background based on the updated orientation of the mobile device in relation to the head orientation.

In the illustrated embodiment, the entities of the environment 300 are communicatively coupled via a network 305. The network 305 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 2 illustrates one network 305 coupled to the server 301 and the mobile device 315, in practice one or more networks 205 may be coupled to these entities.

Example Computing Device 400

Figure 4:
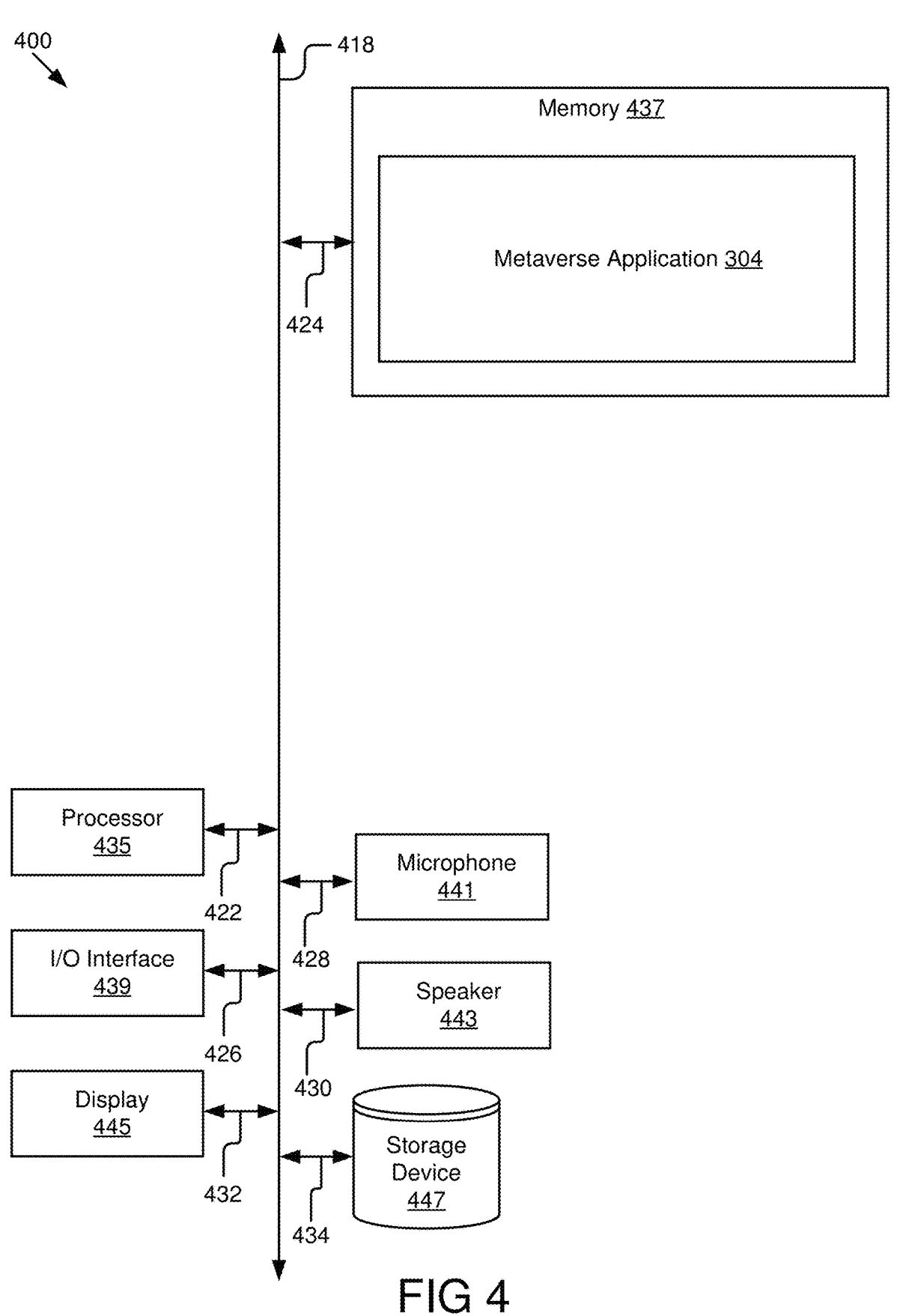
FIG. 4 is a block diagram of an example computing device, according to some embodiments described herein.

FIG. 4 is a block diagram of an example computing device 400 that may be used to implement one or more features described herein. Computing device 400 can be any suitable computer system, server, or other electronic or hardware device. In some embodiments, the computing device 400 is the mobile device 315. In some embodiments, the computing device 400 is the server 301.

In some embodiments, computing device 400 includes a processor 435, a memory 437, an Input/Output (I/O) interface 439, a microphone 441, a speaker 443, a display 445, and a storage device 447, all coupled via a bus 418. In some embodiments, the computing device 400 includes additional components not illustrated in FIG. 4. In some embodiments, the computing device 400 includes fewer components than are illustrated in FIG. 4. For example, in instances where the metaverse application 304 is stored on the server 301 in FIG. 3, the computing device may not include a microphone 441, a speaker 443, or a display 445.

The processor 435 may be coupled to a bus 418 via signal line 422, the memory 437 may be coupled to the bus 418 via signal line 424, the I/O interface 439 may be coupled to the bus 418 via signal line 426, the microphone 441 may be coupled to the bus 418 via signal line 428, the speaker 443 may be coupled to the bus 418 via signal line 430, the display 445 may be coupled to the bus 418 via signal line 432, and the storage device 447 may be coupled to the bus 418 via signal line 434.

Processor 435 can be one or more processors and/or processing circuits to execute program code and control basic operations of the computing device 400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 437 is typically provided in computing device 400 for access by the processor 435, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 435 and/or integrated therewith. Memory 437 can store software operating on the server 301 by the processor 435, including an operating system, software application and associated data. In some implementations, the applications can include instructions that enable processor 435 to perform the functions described herein. In some implementations, one or more portions of metaverse application 304 may be implemented in dedicated hardware such as an application-specific integrated circuit (ASIC), a programmable logic device (PLD), a field-programmable gate array (FPGA), a machine learning processor, etc. In some implementations, one or more portions of the metaverse application 304 may be implemented in general purpose processors, such as a central processing unit (CPU) or a graphics processing unit (GPU). In various implementations, suitable combinations of dedicated and/or general purpose processing hardware may be used to implement the metaverse application 304.

For example, the metaverse application 304 stored in memory 437 can include instructions for retrieving user data, for displaying/presenting avatars, and/or other functionality or software. Any of the software in memory 437 can alternatively be stored on any other suitable storage location or computer-readable medium. In addition, memory 437 (and/or other connected storage device(s)) can store instructions and data used in the features described herein. Memory 437 and any other type of storage (magnetic disk, optical disk, magnetic tape, or other tangible media) can be considered "storage" or "storage devices."

I/O interface 439 can provide functions to enable interfacing the computing device 400 with other systems and devices. Interfaced devices can be included as part of the computing device 400 or can be separate and communicate with the computing device 400. For example, network communication devices, storage devices (e.g., memory 437 and/or storage device 447), and input/output devices can communicate via I/O interface 439. In another example, the I/O interface 439 can receive data from the server 301 and deliver the data to the metaverse application 304 and components of the metaverse application 304, such as the metaverse application 304. In some embodiments, the I/O interface 439 can connect to interface devices such as input devices (keyboard, pointing device, touchscreen, microphone 441, sensors, etc.) and/or output devices (display 445, speaker 443, etc.).

Some examples of interfaced devices that can connect to I/O interface 439 can include a display 445 that can be used to display content, e.g., images, video, and/or a user interface of the metaverse as described herein, and to receive touch (or gesture) input from a user. Display 445 can include any suitable display device such as a liquid crystal display (LCD), light emitting diode (LED), or plasma display screen, cathode ray tube (CRT), television, monitor, touchscreen, three-dimensional display screen, a projector (e.g., a 3D projector), or other visual display device.

The microphone 441 includes hardware, e.g., one or more microphones that detect audio spoken by a person. The microphone 441 may transmit the audio to the metaverse application 304 via the I/O interface 439.

The speaker 443 includes hardware for generating audio for playback. In some embodiments, the speaker 443 may include audio hardware that supports playback via an external, separate speaker (e.g., wired or wireless headphones, external speakers, or other audio playback device) that is coupled to the computing device 400.

The storage device 447 stores data related to the metaverse application 304. For example, the storage device 447 may store a user profile associated with a user, etc. In some embodiments where the computing device 400 is the metaverse application 304a stored on the server 301, the storage device 447 may be the same as the database 399 of FIG. 3.
Example Metaverse Application 304

FIG. 4 illustrates a computing device 400 that executes an example metaverse application 304. The metaverse application 304 generates graphical data for displaying a virtual experience.

In some embodiments, before a user participates in the virtual experience, the metaverse application 304 generates a user interface that includes information about how the user's information may be collected, stored, and/or analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

Figure 5:
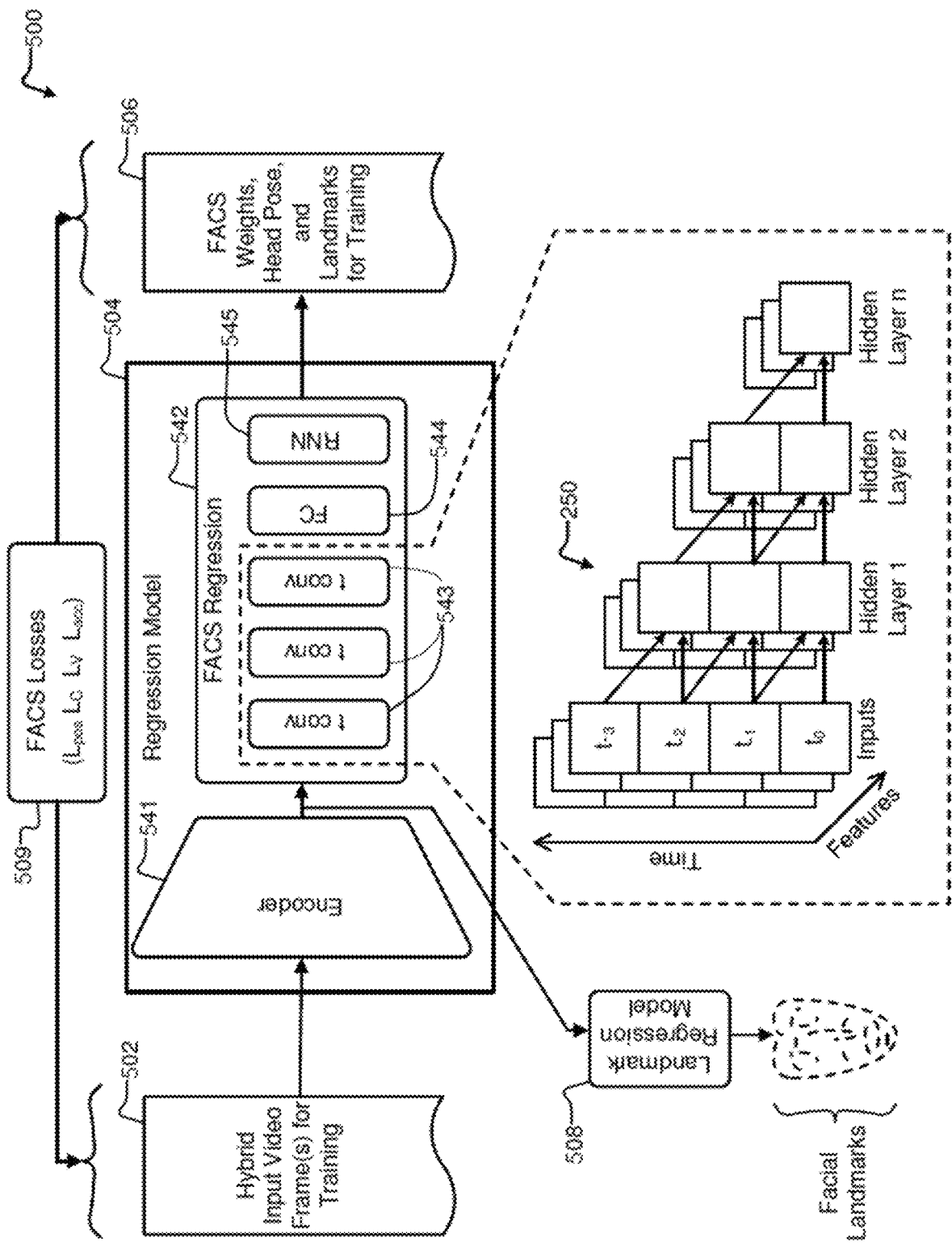
FIG. 5 is a diagram of a training environment for a regression model, according to some embodiments described herein.

The metaverse application 304 receives image frames of a video that include a head of a user. The metaverse application 304 determines facial landmarks of the user in a first frame. In some embodiments, the metaverse application 304 uses a machine-learning model to determine the facial landmarks. For example, the metaverse application 304 may use the regression model described below to output facial landmarks as described below.
Regression Model FIG. 5 is a diagram of a training environment for a regression model, in accordance with some embodiments. As illustrated, a regression model 504 may receive a hybrid labeled data set 502 as input, and may output a set of facial animation coding system (FACS) weights, head poses, and facial landmarks. In this example, the output may be used for training the regression model 5504; however, it should be understood that the outputs may also be used for animation of avatars subsequent to initial training.

In general, the regression architecture 500 uses a multitask setup which co-trains facial landmarks and FACS weights using a shared backbone (e.g., encoder 541) as a facial feature extractor. This arrangement augments the FACS weights learned from synthetic animation sequences with real images that capture the subtleties of facial expression. The FACS regression sub-network 542 is trained alongside a landmark regression model 508. The FACS regression sub-network 542 implements causal convolutions 543. The causal convolutions 543 operate on features over time as opposed to convolutions that only operate on spatial features as found in the encoder 541.

As shown, the input portion of diagram 500 uses a training set comprising hybrid input video frames that are part of a labeled training dataset. The hybrid input video frames include both real video frames captured of a live example person, and synthetic frames created using known FACS weights and known head poses (e.g., example avatar faces created using preconfigured FACS weights, poses, etc.). The training set 502 may be replaced with real video after training. The training set 502 may be input into regression model 504 for training purposes.

The regression model 504 includes encoder 541 and FACS regression sub-network 542. The encoder 541 may generally include one or more sub-networks arranged as a convolutional neural network. The one or more sub-networks may include, at least, a two-dimensional (2D) convolutional sub-network (or layer) and a fully connected (FC) convolutional sub-network (or layer). Other arrangements for the encoder 541 may also be applicable.

The FACS regression sub-network may include causal convolutions 543, fully connected (FC) convolutions sub-network 544, and recurrent neural sub-network (RNN) 545. Causal convolutions 543 may operate over high-level features that are accumulated over time. It is noted that as this architecture is suitable for real time applications, an output prediction is computed in the same time period in which the input arrives (i.e., for each input frame there is a need to predict an output before or at about the time the next frame arrives). This means that there can be no use of information from future time-steps (i.e., a normal symmetric convolution would not work). Accordingly, each convolution of causal convolutions 543 operates with a non-symmetric kernel 550 (example kernel size of 2×1) that only takes past information into account and is able to work in real-time scenarios. The causal convolution layers can be stacked like normal convolution layers. The field of view can be increased by either increasing the size of the kernel or by stacking more layers. While the number of layers illustrated is 3, the same may be increased to an arbitrary number of layers.

As additionally illustrated, during training, FACS losses and landmark regression analysis may be used to bolster accuracy of output 506. For example, the regression model 504 may be initially trained using both real and synthetic images. After a certain number of steps, synthetic sequences may be used to learn the weights for the temporal FACS regression subnetwork 542. The synthetic animation training sequences can be created with a normalized rig used for different identities (face meshes) and rendered automatically using animation files containing predetermined FACS weights. These animation files may be generated using either sequences captured by a classic marker-based approach, or, created by an artist directly to fill in for any expression that is missing from the marker-based data. Furthermore, losses are combined to regress landmarks and FACS weights, as shown in blocks 508 and 509.

For example, several different loss terms may be linearly combined to regress the facial landmarks and FACS weights. For facial landmarks, the root mean square error (RMSE) of the regressed positions can be used by landmark regression model 508 to bolster training. Additionally, for FACS weights, the mean squared error (MSE) is utilized by FACS losses regression model 509. As illustrated, the FACS losses and denoted as Lpos in regression model 509 utilizes velocity loss (Lv), defined as the MSE between the target and predicted velocities. This encourages overall smoothness of dynamic expressions. In addition, a regularization term on the acceleration (Lacc) is added to reduce FACS weights jitter (and its weight is kept relatively low to preserve responsiveness). An unsupervised consistency loss (Lc) may also be utilized to encourage landmark predictions to be equivariant under different transformations, without requiring landmark labels for a subset of the training images.

Once trained, the regression model 504 may be used to extract FACS weights, head poses, and facial landmarks from an input video (e.g., a live video of a user) for use in animating an avatar. For example, the metaverse application 304 associated with the computing device 400 may take the output FACS weights, head poses, and facial landmarks, and generate individual animation frames based upon the same. The individual animation frames may be arranged in sequence, (e.g., in real-time), to present an avatar with a face that is animated based on the input video.

As described above, the regression model 404 may be implemented in computing devices 400 to create animation from input video. A face detection model may be used for the identification FACS weights, head poses, and facial landmarks based on a bounding box, to the regression model 504, as described below.

Face Detection Model

Figure 6:
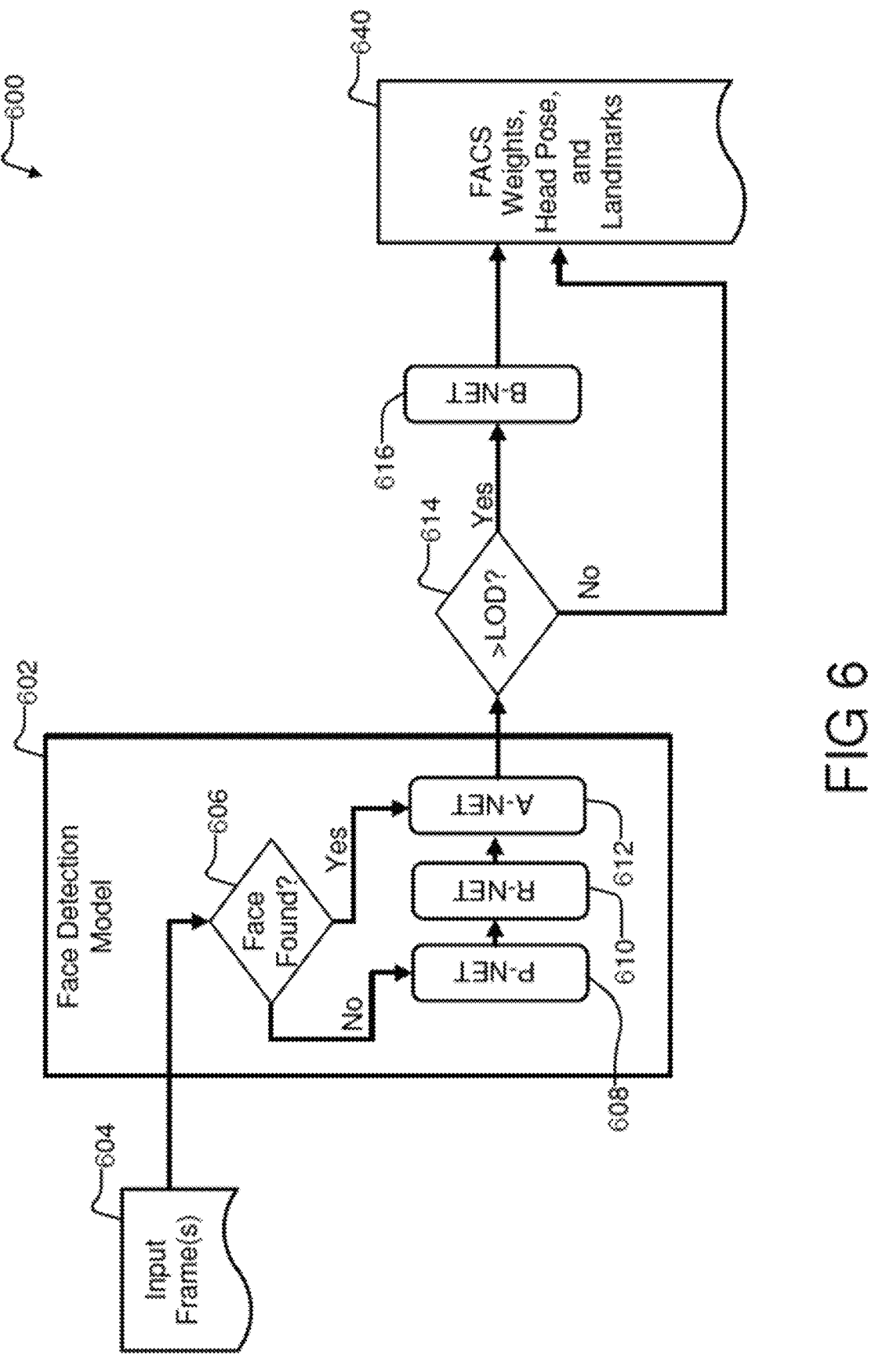
FIG. 6 is a diagram of a face tracking system, according to some embodiments described herein.

FIG. 6 is a diagram of an example face tracking system 600 having a face detection model 602 deployed therein, in accordance with some embodiments. The Facial Tracking System 600 includes four networks-P-Net 608, R-Net 610, A-Net 612, and B-Net 616, and is configured to produce an output 640 comprising predicted FACS weights, head pose, and facial landmarks for regression.

Generally, P-Net 608 receives a whole input frame 604, at different resolutions, and generates face proposals and/or bounding box candidates. P-Net 608 may also be referred to as a fully convolutional network.

R-Net 610 takes as input proposals/bounding box candidates from P-Net 608. R-Net 610 outputs refined bounding boxes. R-Net 610 may also be referred to as a convolutional neural network.

A-Net 612 receives refined proposals and return face probabilities as well as bounding boxes, FACS weights, head poses, and facial landmarks for regression. In one embodiment, the regression may be performed by the regression model 504. B-Net 616 may be similar to A-Net 612, but offer an increased level-of-detail (LOD). In this manner, A-Net 612 may operate with input frames at a different, lower resolution that the B-Net 616.

As illustrated in FIG. 6, an advanced inference decision 606 may be made after a first input frame, which allows the face detection model 602 to circumvent and/or bypass P-Net 608 and R-Net 610, if the face probabilities and/or bounding box output by A-Net 612 indicates a face is detected within the original bounding box. In this manner, several computational steps can be omitted, thereby providing technical benefits including reduced computation time, reduced lag, reduced power usage (that can help conserve battery on battery-powered devices) and improved computational efficiency. As such, face detection model 602 may offer computational efficiency that makes it suitable for use on relatively low computational capacity devices such as smartphones, tablets, or wearable devices. A face detection model comprising P-Net 608, R-Net 610, and A-Net 612 may be usable by relatively low-computational-power mobile devices.

Additionally, during operation, an advanced level-of-detail (LOD) decision 614 may be made after output from A-Net 612 to determine if a higher level-of-detail is appropriate for a particular computing device 400. For example, if a mobile device indicates a lack of available computing resources, a lack of sufficient battery power, or an environment unsuitable for implementing the increased LOD offered by B-Net 616, the entirety of B-Net 616 processing may be omitted on-the-fly. In this manner, the additional computational steps required by B-Net 616 may be omitted, thereby providing technical benefits including reduced computation time, reduced lag, and increased efficiency. As such, face detection model 602 may offer computational efficiency that overcomes the drawbacks of heavy computer vision analysis, and a face detection model comprising P-Net 608, R-Net 610, and A-Net 612 may be executed by relatively low-computational-power mobile devices, or by devices that are under operational conditions that require improved efficiency.

B-Net 616 may be bypassed when one or more conditions are satisfied. For example, such conditions may include low battery reserve, low power availability, high heat conditions, network bandwidth or memory limitations, etc. Appropriate thresholds may be used for each condition. Furthermore, a user-selectable option may be provided allowing a user to direct the face detection model 302 to operate with a lower LOD to provide avatar animation, e.g., within a virtual environment, with low or no impact on device operation.

Both A-Net 612 and B-Net 616 are overloaded output convolutional neural networks. In this regard, each neural network provides a larger number of predicted FACS weights and facial landmarks as compared to a typical output neural network. For example, a typical output network (e.g., O-Net) of a MTCNN may provide as output approximately 5 facial landmarks and a small set of FACS weights. In comparison, both A-Net 612 and B-Net 616 may provide substantially more, e.g., up to or exceeding 175 facial landmarks and several FACS weights. During operation, predicted FACS weights, head poses, and facial landmarks are provided to the regression model 504 (either from A-Net or B-Net) for regression and animation (of the face) of an avatar. It is noted that the regression model 504 may be included in each of A-Net 612 and B-Net 616, such that regression of FACS weights, head poses, and facial landmarks may occur within either implemented output network. Additional description and details related to each of A-Net 612 and B-Net 616 are provided with reference to FIGS. 8A and 8B, respectively.

Hereinafter, additional detail related to the operation of the face detection model 602, and the regression model 504, are provided with reference to FIG. 7.

Generating an Animation Using Trained Models

Figure 7:
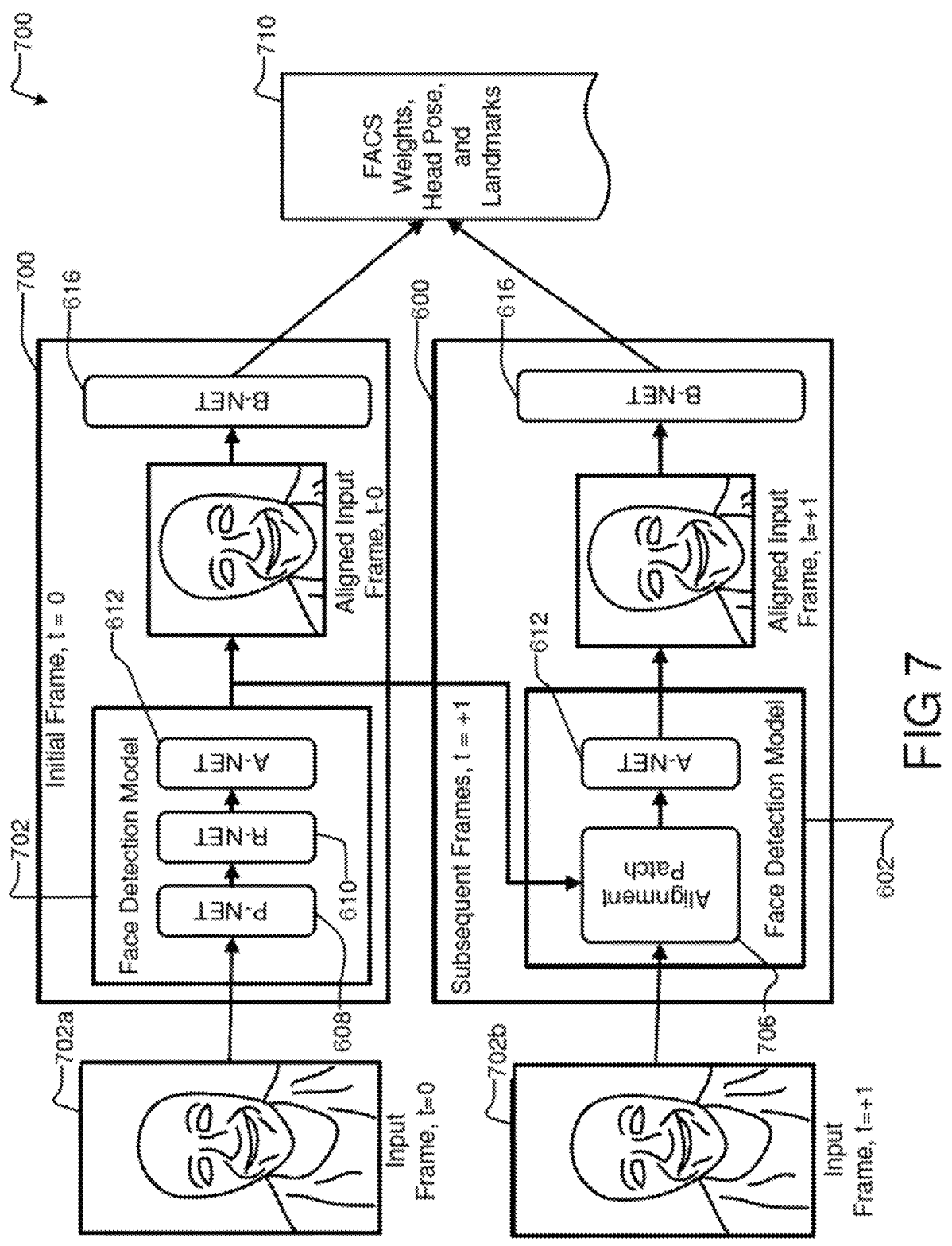
FIG. 7 is a process flow diagram of a regression model and face detection model configured to create a robust animation, according to some embodiments described herein.

FIG. 7 is an example process flow diagram of a regression model 504 and face detection model 602 configured to create an animation of a 3D avatar, in accordance with some embodiments. As shown in the process flow 700, an initial input frame 702a (at timestamp t=0) is provided as input to the face detection model 702. In this example, A-Net 612 and optionally B-Net 616 are dynamically selected by active decision 614 and/or alignment patch 706 when determining output LOD. Accordingly, it should be readily understood that this output network may be a combination of A-Net and B-Net architectures and the decision 614. In some embodiments, the regression model may implement just one of A-Net or B-Net, e.g., depending on available compute capacity, user settings for the quality of facial animation, etc. In some embodiments, decision 614 may be made at runtime with optional utilization of B-Net.

Upon obtaining a refined bounding box or facial landmarks, the input frame is aligned and reduced to outline the identified face. Thereafter, the regression model 504 (a portion of A-net 612 and B-Net 616) takes as input the aligned input frame at t=0, and outputs actual FACS weights, a head pose, and facial landmarks for animation 710.

For subsequent frames 702b (e.g., at timestamp t=+1 and later timestamps), the alignment patch 706 (e.g., based on advanced bypass decision 406), are input directly to the A-Net which determines whether a face is still within the initial bounding box. If the face is still within the initial bounding box, the regression model 504 takes as input the aligned input frame and outputs actual FACS weights, a head pose, and facial landmarks for animation 710 for each subsequent frame where a face is detected within the original bounding box.

In circumstances where a face is not detected within the bounding box, the face detection model 602 may utilize P-Net 608 and R-Net 610 to provide a new bounding box that includes the face.

An overloaded convolutional neural network is used for both A-Net 612 and B-Net 616. Hereinafter, a brief description of A-Net 612 is provided with reference to FIG. 8A, and a brief description of B-Net 616 is provided with reference to FIG. 8B.

Overloaded Output Networks

Figure 8A:
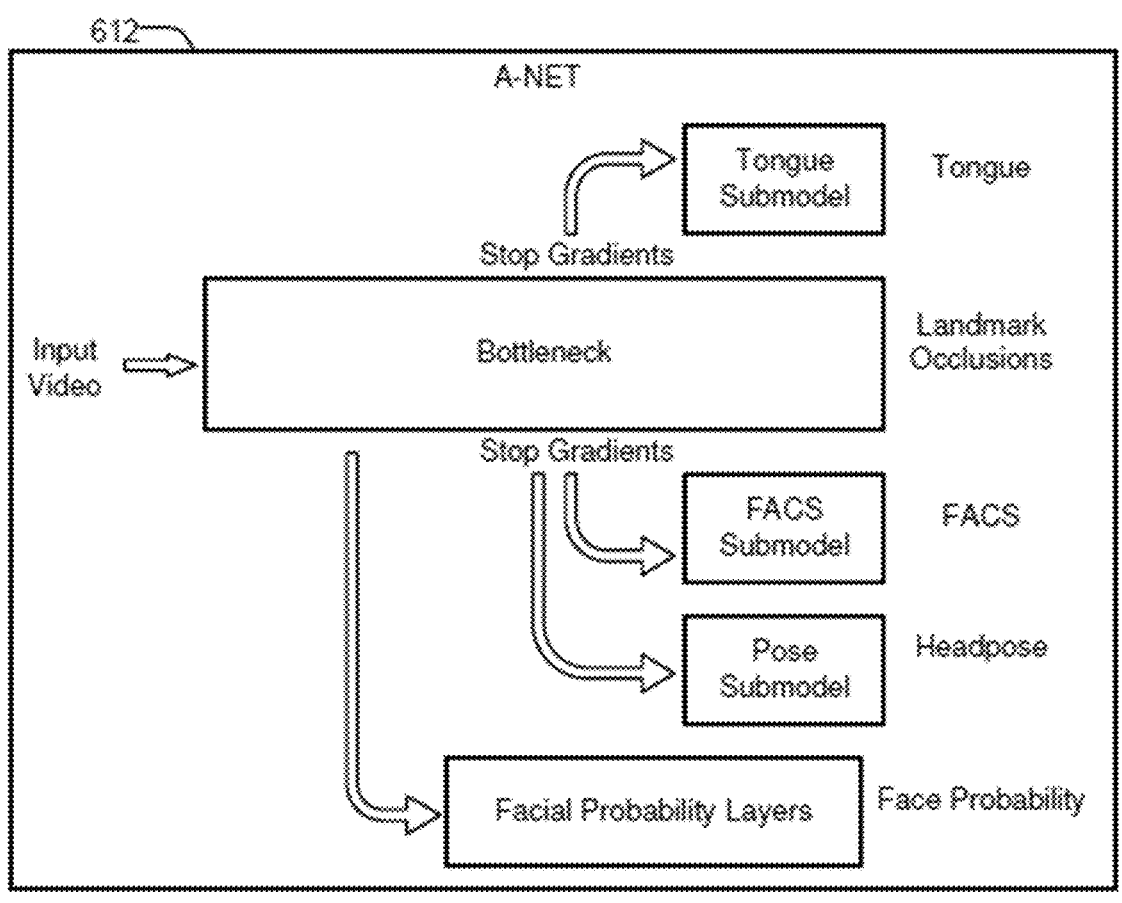
FIGS. 8A-8B are schematics of example output networks for a face detection model, according to some embodiments described herein.
Figure 8B:
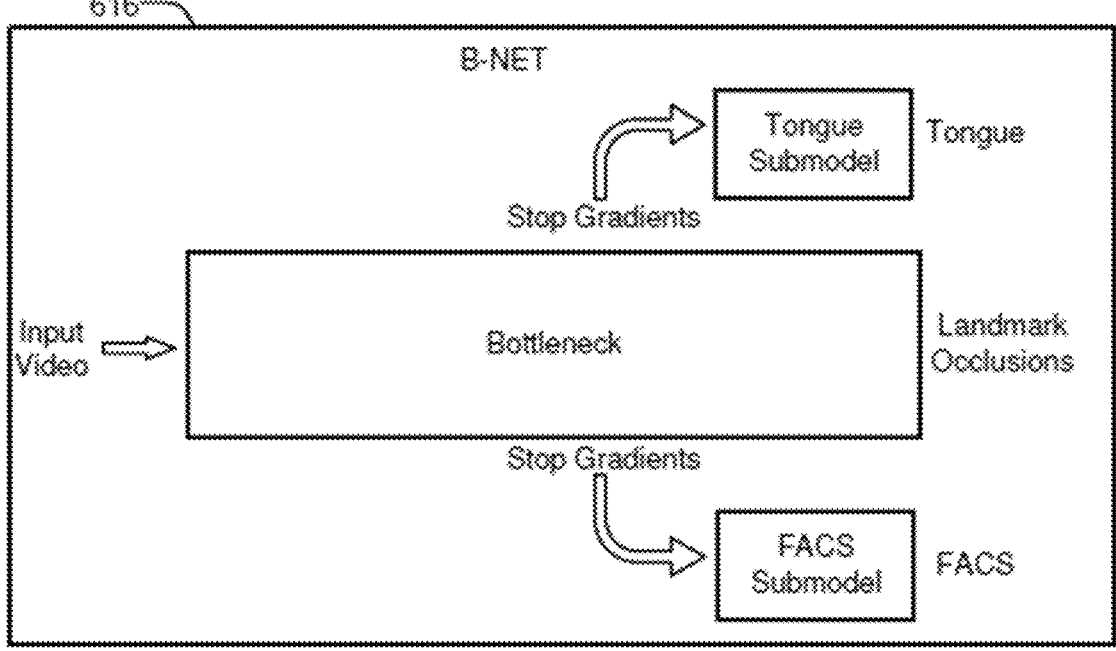

FIGS. 8A and 8B are schematics of example output networks 612 and 616 for face detection model 602, in accordance with some embodiments.

As shown in FIG. 8A, A-Net 612 is overloaded convolutional neural network configured to regress head angles and/or head poses. A-Net comprises a tongue submodel configured to detect a tongue outside of a mouth of the face, a FACS submodel to predict FACS weights, a pose submodel to predict head pose or head angle, and a facial probability layer (or layers) to detect a face within a provided bounding box. A-Net is also configured to detect landmark and occlusion information on those landmarks (e.g., physical occlusions present in input video).

A-Net 612 offers several advantages as compared to a typical output network. First, it allows regressing end-to-end head poses directly. To do so, the alignment used to input the images does not apply any rotation (both when the input is calculated from R-Net predicted bounding box or A-Net landmarks). Additionally, it predicts FACS weights and a tongue signal. In addition, it allows prediction of any number of facial landmarks, in this case, over 175 individual contours or landmarks.

A-Net 612 may be trained in phases. Initially, A-Net 612 may be co-trained with encoder 541 that regresses landmarks and occlusions together with a branch which regresses the face probability. For this training, images of faces with annotated landmarks (both real and synthetic) as well as negative examples (image with no face present or if present, with an unusual scale, e.g., extremely large or small part of the image, only a portion of the face within the image, etc.) are used. This portion of the network and the data has no temporal information.

The subsequent phases train the submodels that regress the FACS controls and the head pose angles, and perform the tongue out detection. Since the encoder 541 is not modified during these training phases, the sub-model training can be performed in any order. The FACS weights and head pose submodels can be trained using synthetic sequences with varying expressions and poses, using temporal architectures which allow for temporal filtering and temporal consistency, as well as losses which enforce it. The tongue out submodel can be a simple classifier trained on real images to detect tongue-out conditions.

Turning to FIG. 8B, B-Net may be implemented to provide a higher LOD, enabling a higher quality of facial animation. Generally, B-Net 616 regresses better quality FACS weights and tongue predictions than A-Net 612. The input image is aligned using the landmarks provided in the same frame by A-Net 612. For example, alignment may be performed using procrustes analysis and/or other suitable shape alignment and/or or contour alignment methodologies.

In this example, B-Net 616 follows a similar structure as A-Net 612, but does not provide face probability and head pose, and has a larger capacity. It is trained in the same way as A-Net: first training for landmarks and occlusion information, followed by FACS weights training and tongue out training. B-Net 616 is also configured to detect landmarks and occlusion information for those landmarks (e.g., physical occlusions present in input video).

With regard to level-of-detail (LOD) and embodiment of B-Net processing, several factors can influence whether B-Net is chosen at decision 614 of FIG. 6. The management of the LOD is based on the type of device it is running on, on the current conditions of the device and the current performance of the face detection model.

Devices with enough compute performance can run on the highest LOD level, e.g., by running both A-Net and B-Net. The performance of the face detection model can be monitored and if the frames per second (FPS) degrades over a certain level B-Net may be bypassed. The LOD can also be lowered if the battery of the device falls under a certain threshold, in order to preserve energy. Furthermore, signals measuring secondary effects on hardware utilization such as CPU temperature can be taken into account to determine the LOD level and correspondingly, whether the B-Net is used.

There might also be certain devices that given their compute budget are restricted to embodiment of A-Net only. This can be done by one or more of a predefined list of devices and/or an online estimation of facial tracker performance.

In case of running only with A-Net, if the quality of the predictions falls under a certain value while already bypassing B-Net, it may be determined that the FACS controls regressed are not of enough quality and instead only a head pose may be provided, with fixed or predetermined FACS weights.

Figure 9:
FIG. 9 is a simplified process flow diagram of a regression model and face detection model configured to create a robust animation, according to some embodiments described herein.
Figure 9:
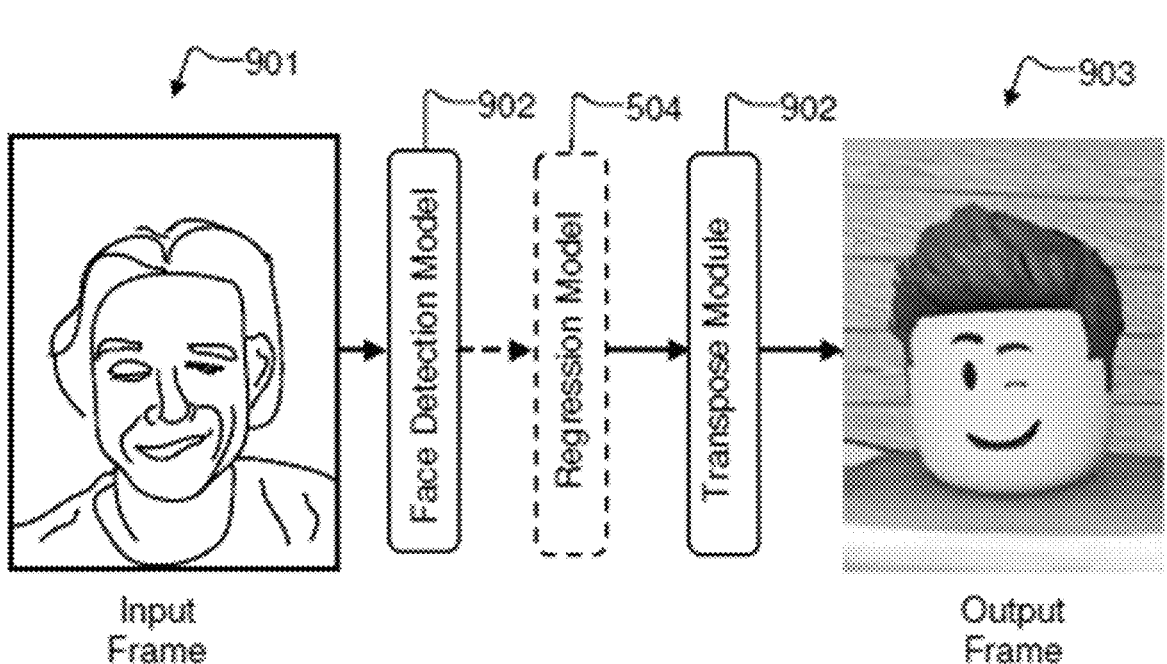

Using A-Net 612 and/or B-Net 616 (which also include the regression model 504), a sequence of output frames for animation of an avatar are generated based upon input video frames provided to the models. FIG. 9 is an example of a simplified process flow diagram of a regression model and face detection model configured to create a robust animation, in accordance with some embodiments. As shown, input frame 901 may be analyzed and facial landmarks extracted, such that output frame 903 is generated through a transpose module 902, based upon movements, gestures, and other features of the face present in input frame 901. The transpose module may be associated with the metaverse application 304. It is noted that any avatar that can be manipulated based upon FACS weights and facial landmarks may be animated using these techniques. Accordingly, while a humanoid output frame is illustrated, any variation of output is possible, and is within the scope of example embodiments of the present disclosure.

The metaverse application 304 receives the bounding box and/or facial landmarks from a machine-learning model as described above. For example, the regression model 504 may be used to extract the facial landmarks from an input video. In another example, a face tracking system 600 may output bounding boxes for a face in an input video. The regression model and the face detection model may be configured to output an animation frame that includes a 3D avatar and a background based on the facial landmarks and the first frame.

In some embodiments, the metaverse application 304 uses the facial landmarks to determine a head orientation of the user in the first frame. Changes in the facial landmarks of the user in the additional frames may indicate that the head of the user moved in a direction that includes up, down, left, right, and any combination of those directions. For example, the metaverse application 304 may use the facial landmarks to determine if a user is looking straight ahead, if the user's head is cocked to one side, if the user is looking downward, etc.

The metaverse application 304 may use the head orientation and the facial landmarks to determine one or more of a roll, yaw, and/or pitch of the head orientation. Roll is rotation about an x-axis. Pitch is rotation about a y-axis. Yaw is rotation around a z-axis. The metaverse application 304 may map an orientation of the mobile device to the head orientation of a user based on a roll, yaw, and pitch of the head orientation. In some embodiments, the metaverse application 304 assigns half of the roll, yaw, and pitch to the head orientation. For example, a user turning their head to the side may be associated with a RYP of −0.36, −1.12, and −0.05. The metaverse application 304 may convert the RUP values to the angles 0.18, 0.56, and 0.02.

For each additional frame of a video subsequent to a first frame, the metaverse application 304 may update the orientation of the mobile device in relation to the head orientation of the user based on the mapping and changes in the facial landmarks of the user in the additional frame. The metaverse application 304 may generate subsequent animation frames that include the 3D avatar and the background based on the updated orientation of the mobile device in relation to the head orientation. In some embodiments, updating the background includes updating a perspective of the background in each subsequent animation frame based on the orientation of the mobile device in relation to the head orientation in a corresponding additional frame of the video.

Figure 10A:
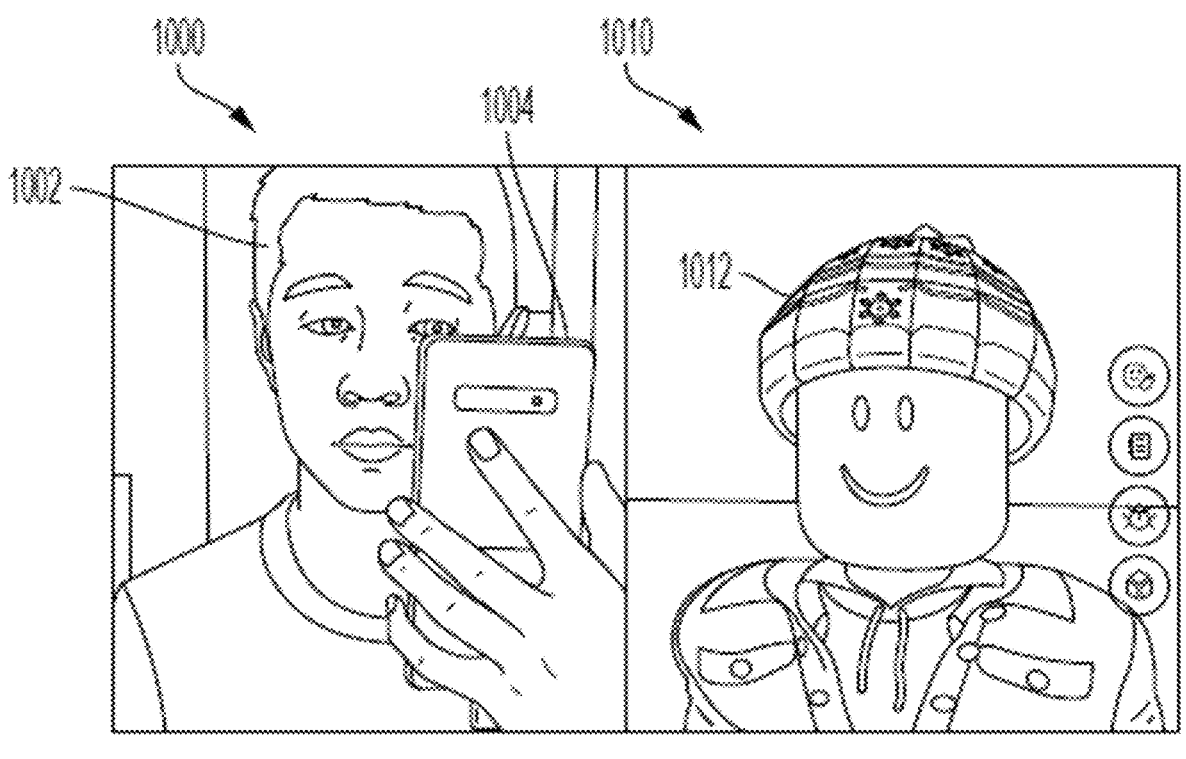
FIGS. 10A-10B include example pairs of image frames of a user and corresponding animated frames that illustrate how changes in a user's head and changes in a position of a mobile device result in the avatar moving its head, according to some embodiments described herein.
Figure 10A:
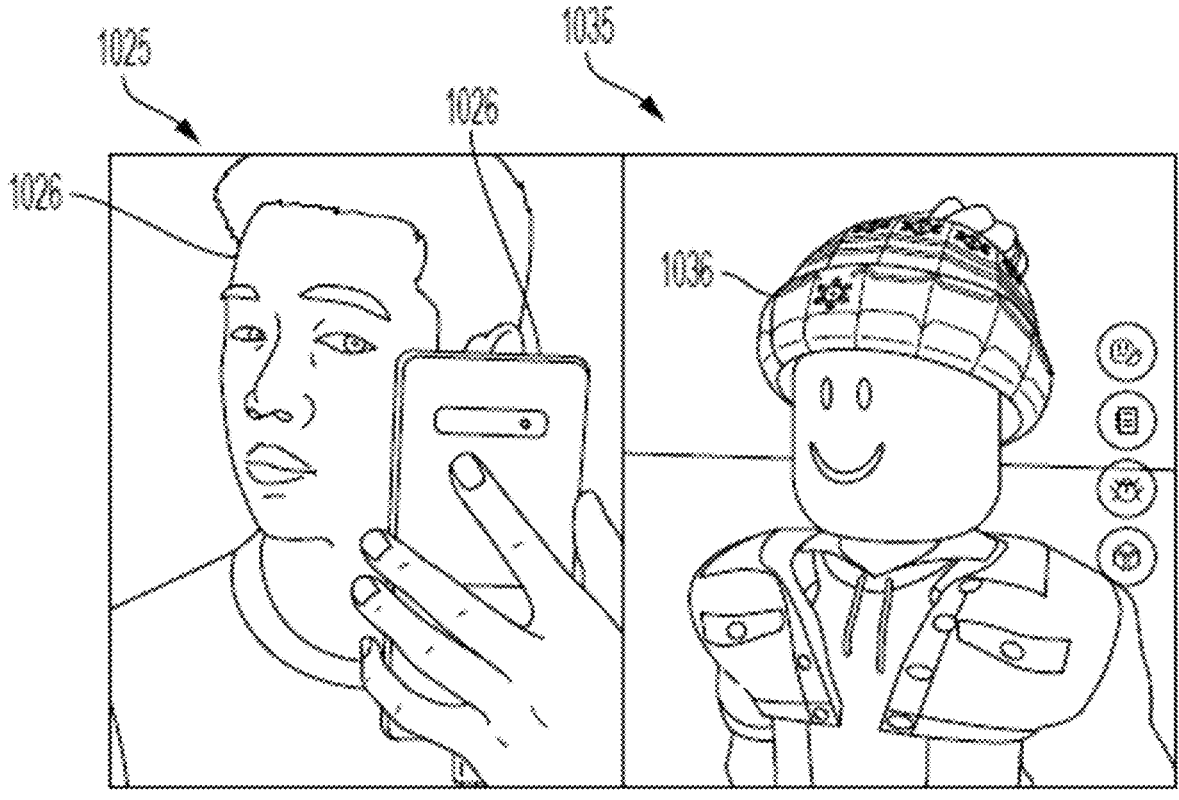
Figure 10B:
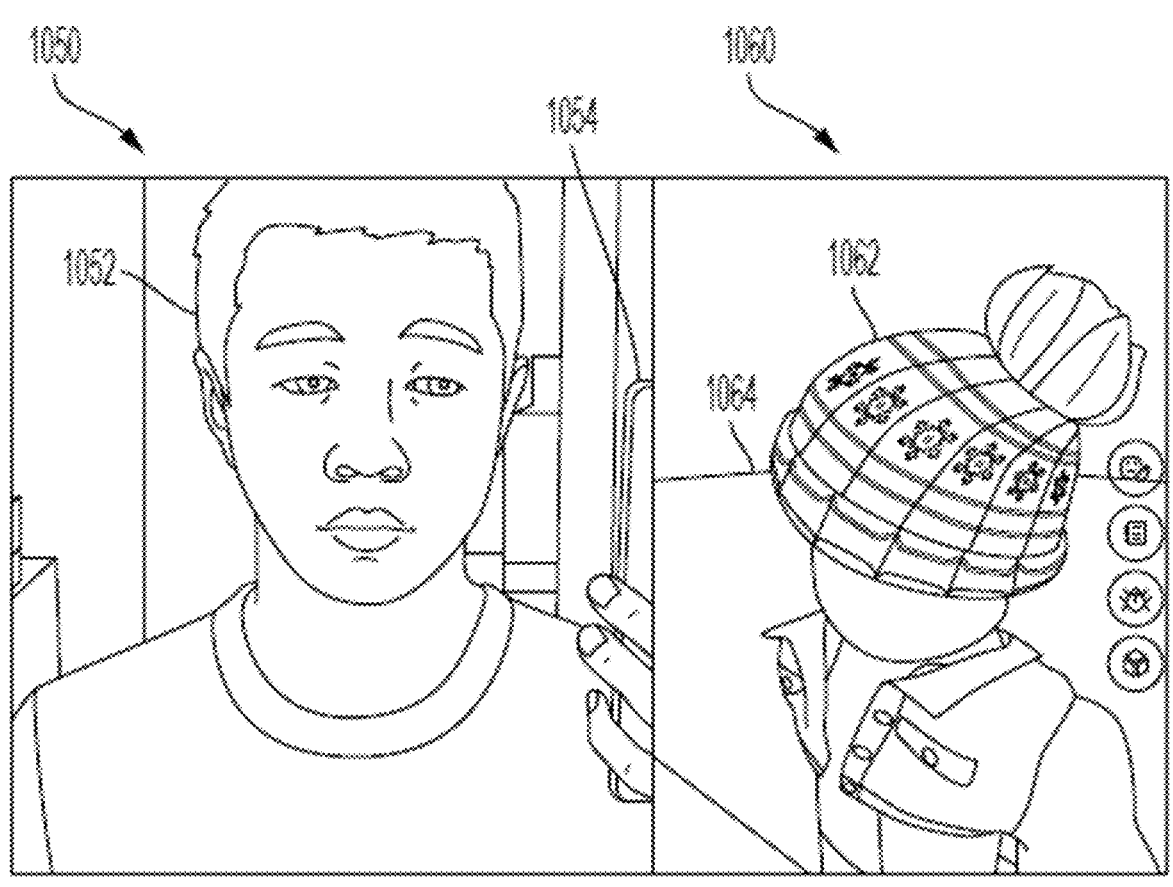

FIGS. 10A-10B include example pairs of image frames of a user and corresponding animated frames that illustrate how changes in a user's head and changes in a position of a mobile device result in the avatar moving its head.

The first image frame 1000 includes a user 1002 with a mobile device 1004 that is slightly to the side of the user 1002. The metaverse application 304 generates an animated frame 1010 with an avatar 1012 that is similarly positioned with a head that is slightly angled.

In some embodiments, a predetermined percentage of the changes in the facial landmarks of the user are applied to change a direction of the face of the avatar and a remaining percentage of the changes in the facial landmarks are applied to change a direction of the mobile device. In some embodiments, 50% of the changes in the facial landmarks are assigned to movement of the face and 50% of the changes in the facial landmarks are assigned to movement of the mobile device.

Continuing with the examples in FIG. 10A, the second image frame 1025 includes a user 1026 that has moved his head to the right while the mobile device 1026 has also moved slightly. The metaverse application 304 generates an animated frame 1035 that is turned accordingly based on movement of the user's 1026 head and movement of the mobile device 1026. In this example, because the user 1026 and the mobile device 1026 are moving in the same plane, the avatar 1036 is rotated based on movement of the user 1026 and movement of the mobile device 1026. For example, if the user 1026 rotates 90 degrees to the left, the metaverse application 304 may attribute a 45 degree rotation to the mobile device 1026.

In FIG. 10B, an image frame 1050 includes a user 1052 with a face that is front facing and a mobile device 1054 that is turned. In this example, turning the mobile device 1054 results in an animation frame 1060 with an avatar 1062 that is rotated and a perspective 1064 of the background that is also rotated.

In some embodiments, a machine-learning model outputs a bounding box for a first frame and one or more of the additional frames in a video. The bounding box may be generated for all of the frames in the video. The bounding box surrounds at least a portion of the head in the frames. In some embodiments, the bounding box encloses eyes and a bottom of a mouth in the head of a user. In some embodiments, the bounding box may be generated depending on different aspects of a user's face. For example, if a user is wearing glasses, the bounding box may use the edges of the glasses as frame for the bounding boxes.

Figure 11:
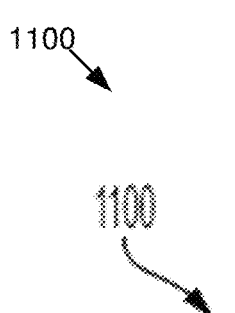
FIG. 11 includes an example image frame that includes a bounding box, according to some embodiments described herein.

FIG. 11 includes an example image frame 1100 that includes a bounding box 1105. The metaverse application 304 may determine x- and y-coordinates for the bounding box 1105. In some embodiments, the metaverse application 304 determines x- and y-coordinates for the upper-left corner 1110 of the bounding box 1105 and the lower-right corner 1125 of the bounding box 1105.

The metaverse application 304 may use a set of four float values that include the {x top left, y top left}, {x bottom right, y bottom right}, which represent the top left and bottom right corner coordinates of the bounding box in the image frame. The values may be normalized to the range of [0, 1]. If the face is centered within the frame and takes up half of the width and height of the video frame, the value is expressed as {0.25, 0.25}, {0.75, 0.75}. Other configurations are possible, such as the lower-left corner and the upper-right corner.

The metaverse application 304 may determine, for each of the bounding boxes, x- and y-coordinates in relation to a width and a height of a respective frame. The frame may be in portrait mode or landscape mode. The dimensions of the frame may also vary as a function of the type of mobile device that is used.

The width and height of image frames may be different even though they are normalized to the same float values. The metaverse application 304 may use two float values to represent the normalized value of the width and height of the face. Continuing with the example above, the normalized value of the face width may be 0.5 and the normalized value of the height may be 0.5. In some embodiments, the metaverse application 304 may use the four float values for the x- and y-coordinates instead of two float values.

The metaverse application 304 may determine, for each of the bounding boxes, a respective distance between the mobile device and the user based on the x- and y-coordinates for the bounding box in relation to the width and the height of the respective frame. The metaverse application 304 may generate subsequent animation frames of the avatar that show the avatar moving closer or farther away depending on a change in the respective distance between the mobile device and the user.

Figure 12A:
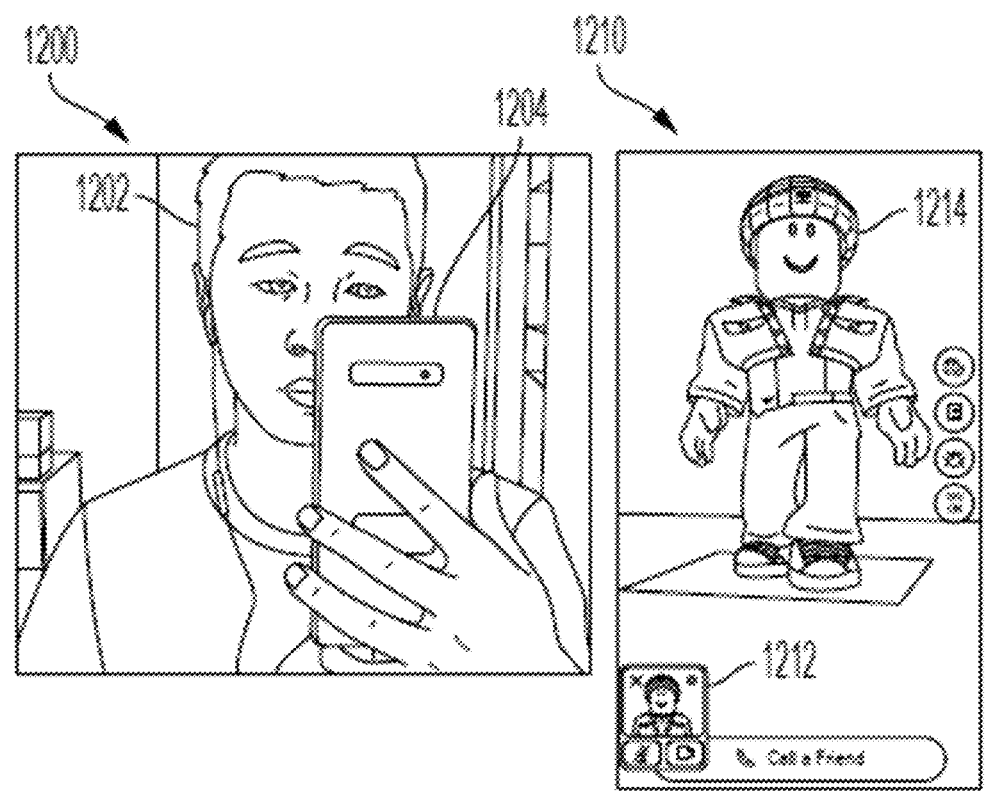
FIGS. 12A-12B include example pairs of image frames of a user and corresponding animated frames that illustrate an avatar in a video call, according to some embodiments described herein.
Figure 12A:
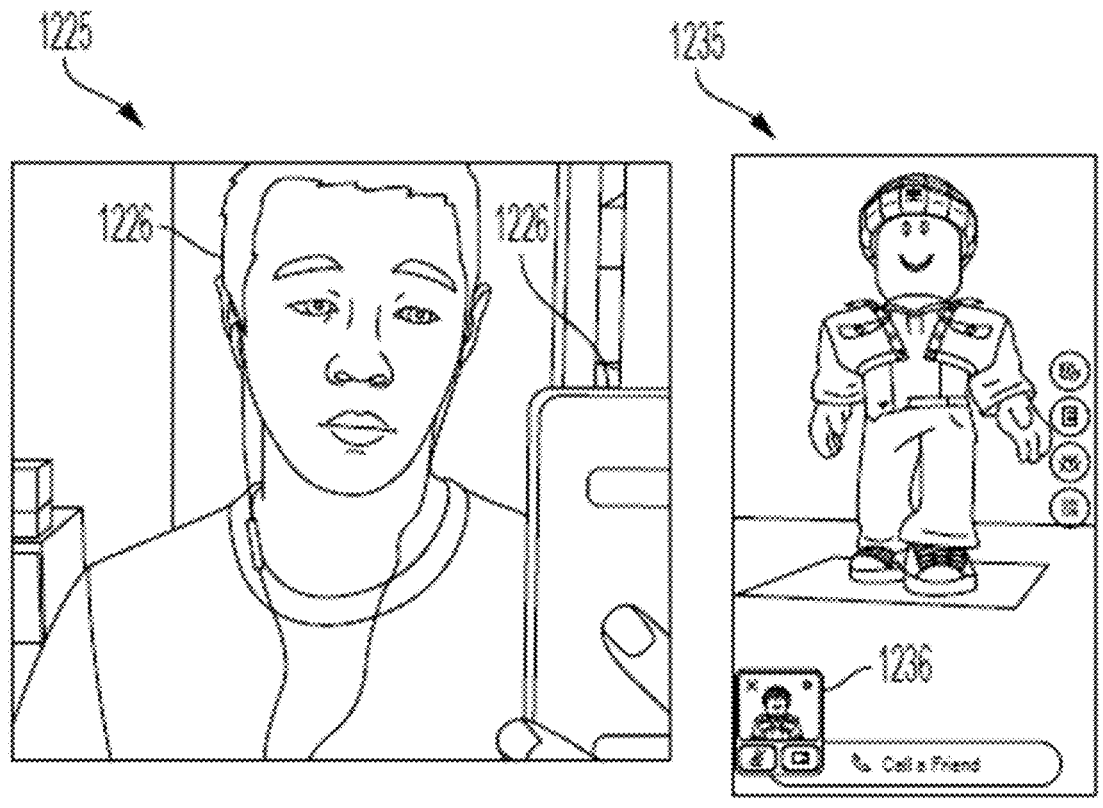
Figure 12B:
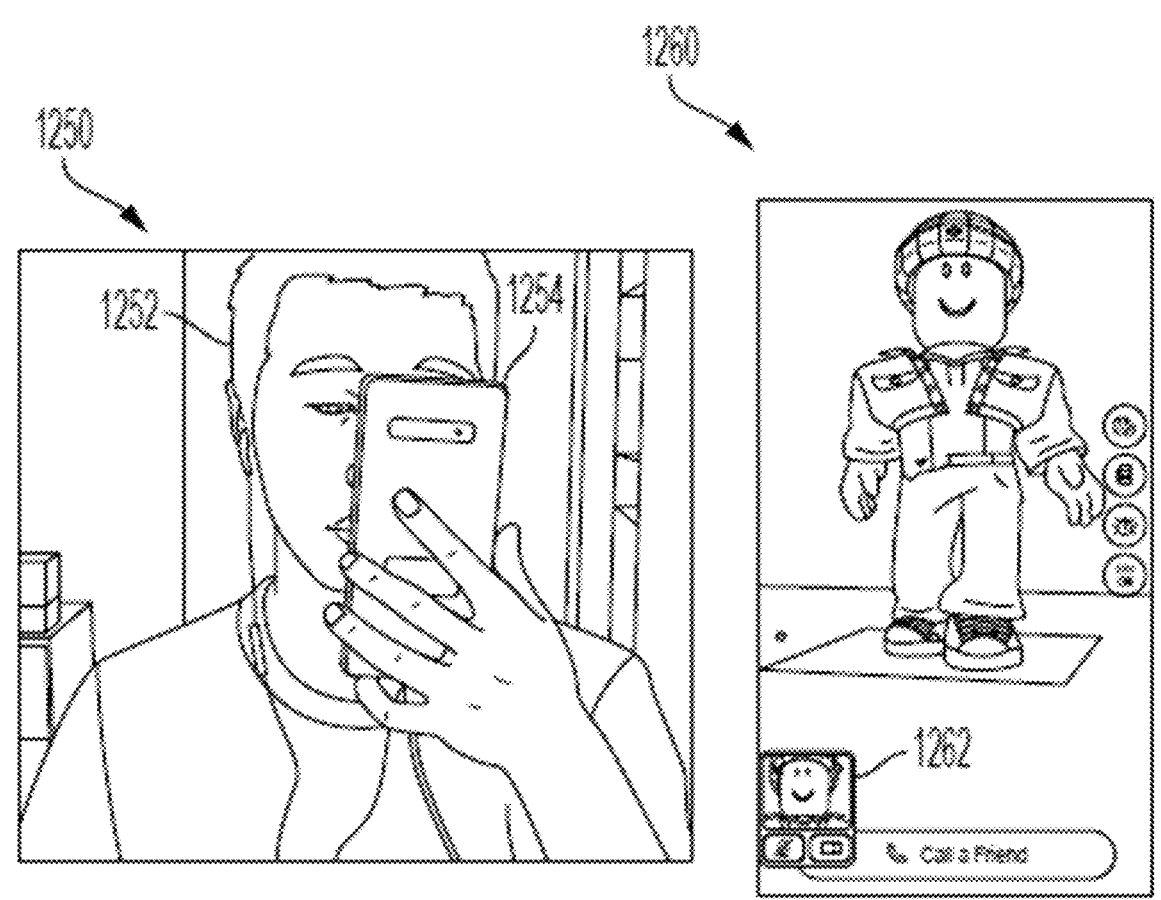

FIGS. 12A-12B include example pairs of image frames of a user and corresponding animated frames that illustrate an avatar in a video call. The first image frame 1200 includes a user 1202 that is facing forward with a mobile device 1204 at a first distance. The metaverse application 304 generates an animation frame 1210 that illustrates a first avatar 1212 that is in a video call with a second avatar 1214. The first avatar 1212 corresponds to the user.

The second image frame 1225 includes a user 1226 that has extended the mobile device 1228 to be further from the user 1226 than the mobile device 1204 in the first image frame 1200 is positioned to the user 1202. The resulting animation frame 1235 includes a first avatar 1236 in a longshot as compared to the first avatar 1212 in the animation frame 1210.

The third image frame 1250 includes a user 1252 that has moved the mobile device 1254 to be closer from the user 1252 than the mobile device 1204 in the first image frame 1200 is positioned to the user 1202. The resulting animation frame 1260 includes a first avatar 1262 in a closeup as compared to the first avatar 1212 in the animation frame 1210.

Example Methods

FIG. 13 is a flow diagram of an example method 1300 to map an orientation of a mobile device to an orientation of a head of a user, according to some embodiments described herein. In some embodiments, all or portions of the method 1300 are performed by the metaverse application 304 stored on the server 301 as illustrated in FIG. 3 and/or the metaverse application 304 stored on the computing device 400 of FIG. 4.

The method 1300 may begin with block 1302. At block 1302, a first frame of a video is received, where the first frame includes a head of a user. Block 1302 may be followed by block 1304.

At block 1304, facial landmarks of the first user in the first frame are determined. In some embodiments, bounding boxes are generated for each of the first frame and one or more of the additional frames that surround at least a portion of the head in the first frame, where the facial landmarks of the user are determined based on the bounding boxes. In some embodiments, the bounding boxes enclose eyes and a bottom of a mouth in the head of the user. Block 1304 may be followed by block 1306.

At block 1306, an animation frame is generated that includes a 3D avatar and a background based on the facial landmarks and the first frame. Block 1306 may be followed by block 1308.

At block 1308, a head orientation of the user in the first frame is determined based on the facial landmarks. Block 1308 may be followed by block 1310.

At block 1310, an orientation of the mobile device is mapped to the head orientation of the user based on one or more of a roll, yaw, and pitch of the orientation of the mobile device. Block 1310 may be followed by block 1312.

At block 1312, for each additional frame of the video subsequent to the first frame, the orientation of the mobile device is updated in relation to the head orientation of the user based on the mapping and changes in the facial landmarks of the user in the additional frame. In some embodiments, the changes in the facial landmarks of the user in the additional frame indicate that the head of the user moved in a direction selected from a set of directions of up, down, left, right, and combinations thereof. In some embodiments, a predetermined percentage of the changes in the facial landmarks of the user are applied to change a direction of a face of the 3D avatar. Block 1312 may be followed by block 1314.

At block 1314, subsequent animation frames are generated that include the 3D avatar and the background based on the updated orientation of the mobile device in relation to the head orientation. In some embodiments, a perspective of the background in each subsequent animation frame is updated based on the orientation of the mobile device in relation to the head orientation in a corresponding additional frame of the video.

In some embodiments, for each of the bounding boxes, x- and y-coordinates are determined in relation to a width and a height of a respective frame and a respective distance is determined between the mobile device and the user based on the x- and y-coordinates for the bounding box in relation to the width and the height of the respective frame, where generating the subsequent animation frames of the 3D avatar includes displaying the 3D avatar as moving closer or farther away depending on a change in the respective distance between the mobile device and the user.

In some embodiments, the video is used during a virtual video call in a virtual experience.

FIG. 14 is a flow diagram of an example method 1400 to determine a change in depth between a mobile device and a user, according to some embodiments described herein. In some embodiments, all or portions of the method 1300 are performed by the metaverse application 304 stored on the server 301 as illustrated in FIG. 3 and/or the metaverse application 304 stored on the computing device 400 of FIG. 4.

The method 1400 may begin with block 1402. At block 1402, a mobile device receives a first frame of a video, where the first frame includes a head of a user. Block 1402 may be followed by block 1404.

At block 1404, facial landmarks of the user in the first frame are determined. Block 1404 may be followed by block 1406.

At block 1406, bounding boxes are generated for each of the first frame and one or more additional frames of the video that surround at least a portion of the head in the first frame, where the bounding boxes are generated based on the facial landmarks. Block 1406 may be followed by block 1408.

At block 1408, for each bounding box, x- and y-coordinates are determined in relation to a width and a height of a respective frame and a respective distance between the mobile device and the user based on the x- and y-coordinates for the bounding box in relation to the width and the height of the respective frame. Block 1408 may be followed by block 1410.

At block 1410, subsequent animation frames are generated that include the 3D avatar and the background with the 3D avatar displayed as moving closer or farther away depending on a change in the respective distance between the mobile device and the user.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various embodiments. In some embodiments, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., mobile device only; client+server device; etc.) and where the data analysis is performed (e.g., mobile device only; client+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one embodiments of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
receiving, at a mobile device, a first frame of a video, wherein the first frame includes a head of a user;
determining locations of facial landmarks of the user in the first frame;
generating an animation frame that includes a three-dimensional (3D) avatar and a background based on the facial landmarks and the first frame;
determining a head orientation of the user in the first frame based on the facial landmarks;
for each additional frame of the video subsequent to the first frame, determining one or more of roll, yaw, and pitch of the head orientation of the user based on changes in the locations of the facial landmarks of the user in the additional frame as compared to a previous frame; and
generating subsequent animation frames, corresponding to each additional frame, that include the 3D avatar and the background by applying a particular percentage of the one or more of roll, yaw, and pitch of the head orientation of the user in the additional frame to a corresponding head orientation of the 3D avatar, wherein a remaining percentage of the one or more of roll, yaw, and pitch are associated with movement of the mobile device.

2. The method of claim 1, wherein generating the subsequent animation frames further includes:
updating a perspective of the background in each subsequent animation frame based on the remaining percentage of the one or more of roll, yaw, and pitch that are associated with movement of the mobile device.

3. The method of claim 1, wherein the determining one or more of roll, yaw, and pitch of the head orientation of the user includes determining that the head of the user moved in a direction that is selected from a set of directions of up, down, left, right, and combinations thereof.

4. The method of claim 1, wherein the particular percentage of the one or more of roll, yaw, and pitch is 50 percent.

5. The method of claim 1, further comprising:
generating a bounding box for each of the first frame and one or more of the additional frames that surrounds at least a portion of the head in the first frame, wherein the locations of the facial landmarks of the user are determined based on the bounding box.

6. The method of claim 5, wherein the bounding box encloses eyes and a bottom of a mouth in the head of the user.

7. The method of claim 5, further comprising:
determining, for each bounding box of a respective frame, wherein the respective frame is the first frame or one of the additional frames:
x- and y-coordinates in relation to a width and a height of the respective frame; and
a distance between the mobile device and the user based on the x- and y-coordinates for the bounding box in relation to the width and the height of the respective frame;
wherein generating the subsequent animation frames that include the 3D avatar includes displaying the 3D avatar as moving closer or farther away as compared to a previous animation frame depending on a change in the distance between the mobile device and the user.

8. The method of claim 1, wherein the video is used during a virtual video call in a virtual experience.

9. A system comprising:
a processor; and
a memory coupled to the processor, with instructions stored thereon that, when executed by the processor, cause the processor to perform operations comprising:
receiving a first frame of a video, wherein the first frame includes a head of a user;
determining locations of facial landmarks of the user in the first frame;
generating an animation frame that includes a three-dimensional (3D) avatar and a background based on the facial landmarks and the first frame;
determining a head orientation of the user in the first frame based on the facial landmarks;
for each additional frame of the video subsequent to the first frame, determining one or more of a roll, yaw, and pitch of the head orientation of the user based on changes in the locations of the facial landmarks of the user in the additional frame as compared to a previous frame; and
generating subsequent animation frames, corresponding to each additional frame, that include the 3D avatar and the background by applying a particular percentage of the one or more of roll, yaw, and pitch of the head orientation of the user in the additional frame to a corresponding head orientation of the 3D avatar, wherein a remaining percentage of the one or more of roll, yaw, and pitch are associated with movement of a mobile device.

10. The system of claim 9, wherein generating the subsequent animation frames further includes:
updating a perspective of the background in each subsequent animation frame based on the remaining percentage of the one or more of roll, yaw, and pitch that are associated with movement of the mobile device.

11. The system of claim 9, wherein determining one or more of roll, yaw, and pitch of the head orientation of the user includes determining that the head of the user moved in a direction that is selected from a set of directions of up, down, left, right, and combinations thereof.

12. The system of claim 11, wherein the operations further comprise:
generating a bounding box for each of the first frame and one or more of the additional frames that surrounds at least a portion of the head in the first frame, wherein the locations of the facial landmarks of the user are determined based on the bounding box.

13. The system of claim 12, wherein the bounding box boxes encloses eyes and a bottom of a mouth in the head of the user.

14. The system of claim 9, wherein the particular percentage of the one or more of roll, yaw, and pitch is 50 percent.

15. A non-transitory computer-readable medium with instructions that, when executed by one or more processors, cause the one or more processors to perform operations, the operations comprising:
receiving a first frame of a video, wherein the first frame includes a head of a user;
determining locations of facial landmarks of the user in the first frame;
generating an animation frame that includes a three-dimensional (3D) avatar and a background based on the facial landmarks and the first frame;
determining a head orientation of the user in the first frame based on the facial landmarks;

for each additional frame of the video subsequent to the first frame, determining one or more of roll, yaw, and pitch of the head orientation of the user based on changes in the locations of the facial landmarks of the user in the additional frame as compared to a previous frame; and generating subsequent animation frames, corresponding to each additional frame, that include the 3D avatar and the background by applying a particular percentage of the one or more of roll, yaw, and pitch of the head orientation of the user in the additional frame to a corresponding head orientation of the 3D avatar, wherein a remaining percentage of the one or more of roll, yaw, and pitch are associated with movement of a mobile device.

16. The non-transitory computer-readable medium of claim 15, wherein generating the subsequent animation frames further includes:

updating a perspective of the background in each subsequent animation frame based on the remaining percentage of the one or more of roll, yaw, and pitch that are associated with movement of the mobile device.

17. The non-transitory computer-readable medium of claim 15, wherein determining one or more of roll, yaw, and pitch of the head orientation of the user includes determining that the head of the user moved in a direction that is selected from a set of directions of up, down, left, right, and combinations thereof.

18. The non-transitory computer-readable medium of claim 15, wherein the particular percentage of the one or more of roll, yaw, and pitch is 50 percent.

19. The non-transitory computer-readable medium of claim 15, wherein the operations further comprise:

generating a bounding box for each of the first frame and one or more of the additional frames that surrounds at least a portion of the head in the first frame, wherein the locations of the facial landmarks of the user are determined based on the bounding box.

20. The non-transitory computer-readable medium of claim 19, wherein the bounding box encloses eyes and a bottom of a mouth in the head of the user.

\* \* \* \* \*